United States Patent [19]

Beck et al.

[11] Patent Number: 4,885,717

[45] Date of Patent: Dec. 5, 1989

[54] SYSTEM FOR GRAPHICALLY REPRESENTING OPERATION OF OBJECT-ORIENTED PROGRAMS

[75] Inventors: Kent L. Beck, Aloha; Howard G. Cunningham, Jr., Beaverton, both of Oreg.

[73] Assignee: Tektronix, Inc., Beaverton, Ohio

[21] Appl. No.: 912,025

[22] Filed: Sep. 25, 1986

[51] Int. Cl.$^4$ ............................................. G06F 11/30
[52] U.S. Cl. ................................. 364/900; 364/944.6; 364/929.3
[58] Field of Search ... 364/200 MS File, 900 MS File

[56] References Cited

U.S. PATENT DOCUMENTS

| | | | |
|---|---|---|---|
| 3,324,458 | 6/1967 | MacArthur | 364/200 |
| 4,320,451 | 3/1982 | Bachman et al. | 364/200 |
| 4,385,367 | 5/1983 | Nakao et al. | 364/900 |
| 4,555,775 | 11/1985 | Pike | 364/900 |
| 4,558,413 | 12/1985 | Schmidt et al. | 364/200 |
| 4,656,603 | 4/1987 | Dunn | 364/488 |
| 4,713,656 | 12/1987 | Cliff et al. | 364/900 |

*Primary Examiner*—Gareth D. Shaw
*Assistant Examiner*—Debra A. Chun
*Attorney, Agent, or Firm*—John P. Dellett; Robert S. Hulse

[57] ABSTRACT

A "diagramming debugger" creates a graphical representation of the sequence of messages sent during operation of an object-oriented program. When one object transmits a message to another object, the diagramming debugger displays representations of the transmitting and receiving objects on a computer screen, each representation comprising a box with labels identifying the represented object. The box representing a sending object includes therewithin a symbol (comprising, for example, one or more characters) identifying the method that sent the message, while the box representing the receiving object includes therewithin a symbol identifying the method invoked by the message. The message is represented by an arrow pointing from the symbol identifying the sending method to the symbol identifying the invoked method.

17 Claims, 12 Drawing Sheets

SYSTEM FOR GRAPHICALLY REPRESENTING OPERATION OF OBJECT-ORIENTED PROGRAMS

BACKGROUND OF THE INVENTION

This invention relates in general to systems for monitoring operation of software programs and in particular to a system for monitoring and documenting sequences of operations performed by object-oriented computer programming systems.

When computer processors were first developed, they were programmed directly in machine language and programs comprised sequences of binary encoded instructions indicating operations to be performed by a computer processor on a step-by-step basis. To facilitate programming, assembly languages were developed in which machine language instructions were represented by mnemonics and an assembly language program consisted of a collection of such mnemonics listed in the order that the instructions they represent were to be carried out. As higher level languages such as "Basic", "Fortran", "Pascal" and the like were developed, complex functions often requiring the processor to execute hundreds or even thousands of machine language instructions were represented by code comprising relatively few words, numbers and symbols more easily understood by humans than assembly language mnemonics. Yet even in these higher level languages, programs consist of code generally listed in the order in which the functions represented by the code are to be performed by the computer.

Such "sequential" languages are particularly useful for writing programs which cause a computer to carry out a predetermined sequence of operations. However computers are often utilized for modeling systems of interactive components in order to determine sequences of actions such systems would perform under various conditions. For example a programmer may wish to program a computer to mimic the manner in which some particular digital logic network responds to a particular input stimulus. When the programmer doesn't know beforehand what sequence of steps the logic network would carry out in response to the stimulus, but only how each individual component changes its outputs in response to a change to its inputs, the programmer often finds it difficult to utilize sequentially organized instructions to program a computer to model the behavior of the system.

In contrast to sequentially organized software, "object-oriented" software is organized into "objects", each comprising a block of computer instructions describing various procedures ("methods") to be performed in response to "messages" sent to the object. Such operations include, for example, the manipulation of variables and the transmission of one or more messages to other objects. Thus one "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects. Typically a user may stimulate an object through an image on a computer terminal representing the object, for example by utilizing a mouse to control a cursor on the screen to select the object, and by utilizing buttons on the mouse or a keyboard to transmit messages to the selected object. An object may also provide information to the user through its image on the screen by means of data displays or graphical changes to its image.

An operator may stimulate a collection of interrelated objects comprising an object-oriented program by sending a message to one of the objects. A method of the object receiving the message may cause the object to respond, carrying out predetermined functions which may include sending messages to one or more other objects. The other objects may in turn carry out additional functions in response to the messages they receive, including sending still more messages. In such manner sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce a change in an image on a screen or some other observable computer output. Some object-oriented programming systems include a "debugger" permitting a programmer to interrupt program operation at any point, to inspect the states of variables controlled by each object, and to review and change the methods associated with objects in the system. Some debuggers also provide a listing (a "message stack") of the messages which have been sent, but for which a response has not yet been completed. While such debuggers are useful, it is nonetheless difficult for a programmer to comprehend the sequence of actions performed with an object-oriented program, simply by interrupting a program and reviewing the message stack or current state of variables maintained via the objects involved.

SUMMARY OF THE INVENTION

In an object-oriented computer program, software is organized into "objects" each comprising a block of program instructions describing various procedures ("methods") to be performed in response to "messages" sent to the object from another object. In accordance with the present invention, a "diagramming debugger" creates a graphical representation of the sequence of messages sent during operation of an object-oriented program. When one object transmits a message to another object, the diagramming debugger displays representations of the transmitting and receiving objects on a computer screen, each representation suitably comprising a box with labels identifying the represented object. The box representing a sending object includes therein a symbol (comprising, for example, one or more characters) identifying the method that sent the message, while the box representing the receiving object includes therein a symbol identifying the method invoked by the message. The message is suitably represented by an arrow pointing from the symbol identifying the sending method to the symbol identifying the invoked method.

As program operation continues, a box representing an object may be added to the display whenever the object first receives a message, and a symbol representing an additional method may be added to an existing box whenever the method is first invoked. The order in which arrows are drawn on the screen between method symbols within the displayed boxes provides a graphical representation of the order in which messages are sent. Thus by continually adding boxes, method symbols, and arrows to the display as the program progresses, the diagramming debugger "animates" program operation so as to make the sequence of messages sent and methods performed by an object-oriented program easier to follow and comprehend.

It is accordingly an object of the present invention to provide a graphical representation of a sequence of operations performed by an object-oriented computer program.

The subject matter of the present invention is particularly pointed out and distinctly claimed in the concluding portion of this specification. However, both the organization and method of operation of the invention, together with further advantages and objects thereof, will best be understood by reference to the following description taken in connection with accompanying drawings.

DRAWINGS

FIGS. 1-12 are illustrations of displays produced on a computer screen according to the method of the present invention.

DETAILED DESCRIPTION

Figure 1:
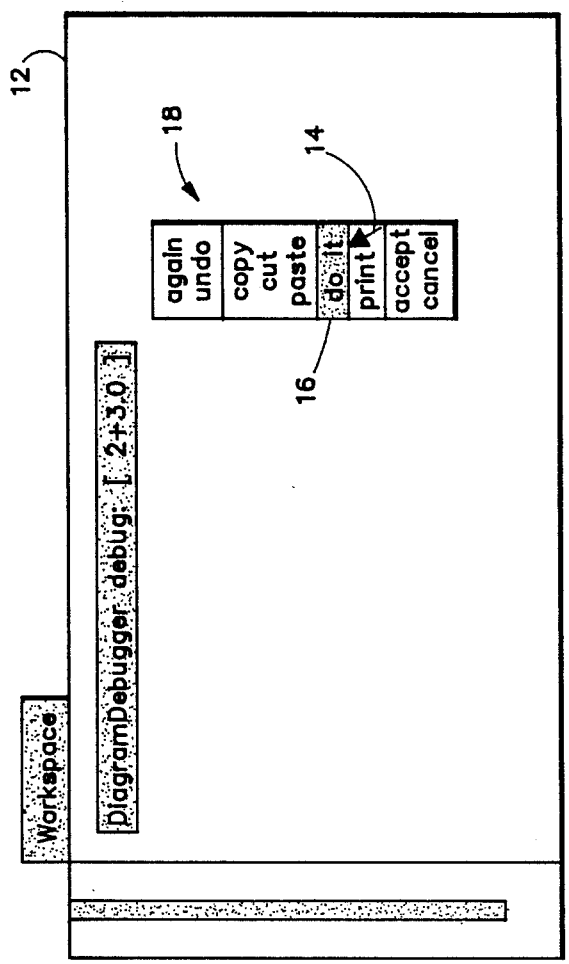

In "object-oriented" computer programs, software is organized into a collection of "objects", each object comprising a block of program instructions describing various procedures ("methods") to be performed by the computer in response to various commands ("messages") sent to the object. Such operations may include, for example, the manipulation of stored data, control of visual displays or other computer outputs, and the transmission of one or more messages to invoke methods performed by other objects One "programs" in an object-oriented programming system by creating a collection of individual blocks of code each of which defines the methods associated with an object, each method including an indication of the message which invokes the method and a set of instructions for causing the computer to carry out an operation or a set of operations in response to the message.

A user may initiate program operation by sending a message to one of the collection of objects comprising a program using a keyboard, mouse or other computer input means which is monitored by the receiving object. In response to the initial message, a method in the receiving object may cause the computer to carry out predetermined activities which include sending messages to one or more other objects in the system. These other objects may in turn carry out activities in response to the messages they receive, including sending still more messages to additional objects in the system. In such fashion a sequence of message and response may continue indefinitely following the initial message, or may come to an end when all messages are complete and no new messages are sent.

Thus while code in an object-oriented program is generally not organized in sequential fashion, an object-oriented program nonetheless may perform a sequence of operations in response to a stimulus message. As stated, the nature of such sequence of operations is not readily apparent to a programmer simply by reviewing the software listing and a programmer may find it hard to determine or comprehend how an object-oriented program "works" in terms of the steps it carries out, a disadvantage when attempting to debug a program which does not behave as expected.

In accordance with the present invention, the sequence of message transmissions carried out by a collection of objects of an object-oriented program is graphically represented. When one object transmits a message to another object, representations of the transmitting and receiving objects are displayed on a computer screen, each representation suitably comprising a box with labels identifying the represented object. The box representing the sending object includes therein a "selector" (a symbol comprising, for example, one or more characters) identifying the method that sent the message, while the box representing the receiving object includes therein a selector identifying the method invoked by the message. The message is suitably represented with an arrow pointing from the selector identifying the sending method to the selector identifying the invoked method. As program operation continues, a box representing an object may be added to the display whenever the object first receives a message, and a selector representing a method of an object may be added to an existing box representing the object whenever the method is first invoked. Selectors and arrows appearing on the screen at any time comprise a representation (hereinafter referred to as a "Cunningham diagram") of the messages sent in the course of executing a program, identifying the sending and receiving method associated with each message. The order in which arrows and selectors are added to the Cunningham diagram provides a graphical indication of the order in which the messages were sent and methods invoked. Thus by sequentially adding boxes, selectors, and arrows to the display as the program progresses, the present invention "animates" object oriented program operation so as to make the sequence of messages and responses occurring in the course of executing an object-oriented program easy to follow and comprehend.

The preferred embodiment of the present invention is implemented as an improvement to "Smalltalk-80" (hereinafter referred to as "Smalltalk"), a well known object-oriented computer programming language. "Smalltalk-80" is a registered trademark of the Xerox Corporation and the Smalltalk computer language is described in the books *Smalltalk-80, The Language and Its Implementation*, by Adele Goldberg and David Robson, and *Smalltalk-80, the Interactive Programming Environment*, by Adele Goldberg, both published in 1983 by the Addison-Wesley Publishing Company, and incorporated herein by reference.) As a programming convenience, Smalltalk objects are created and identified according to a hierarchy of object "classes", each object class comprising a set of one or more methods for implementing behavior common to each object of the class. In creating a new class of objects whose behavior varies in some respect from the behavior of an existing class, the new class is established as a "subclass" of the existing class. Objects of the new subclass may rely on code implementing methods shared in common with objects of its "superclass" (the existing class) and only code implementing methods which differ from methods of its superclass need be separately written and stored when creating the subclass. All Smalltalk classes are created as subclasses of an existing class, except the "root" class of the Smalltalk system, class Object, and it is by creating classes in this fashion that a tree-like hierarchy of object classes is created. Objects of any particular class may make use of methods of any of its "ancestral" superclasses in the hierarchy when its own class has no suitable method for responding to a particular message.

To illustrate the use and operation of the present invention, the sequence of operations carried out by a collection of objects in the Smalltalk system in evaluating the Smalltalk expression "2+3.0" will be described and then illustrated by a sequence of Cunningham diagrams produced according to the present invention. The expression "2+3.0" transmits a message +3.0 to the integer 2, a Smalltalk object. The hierarchy of Smalltalk classes relating to an object such as 2 is shown below in table I.

TABLE 1

Object
Magnitude
Number
Float
Fraction
Integer
LargeNegativeInteger
LargePositiveInteger
SmallInteger All Smalltalk classes descend from the class Object. Classes which represent various kinds of numbers are subclasses of class Number. Number is a subclass of the class Magnitude, a direct subclass of Object. (Other subclasses of class Magnitude not shown in Table I include, for example, Date and Time.) The class Number has three subclasses: Float for objects representing various floating point numbers, Fraction for objects representing fractional numbers, and Integer for objects representing integers. Subclasses LargeNegativeInteger and LargePositiveInteger of class Integer contain methods for objects representing negative and positive integers requiring more than a single machine word to be expressed in binary form. A subclass SmallInteger of Integer contains methods for objects representing integers requiring only a single machine word to be expressed in binary form. The number 2 is an object of the SmallInteger class.

In the message +3.0 sent to the Smalltalk object 2, the "+" symbol is a "method selector" which identifies a procedure (method) to be executed by the receiving object in response to the message. (By convention the method names are expressed in boldface type.) The number "3.0" is an "argument" of the message +3.0 comprising input data required in the course of executing the + method. When the object 2 receives the message +3.0, it searches the methods of its class SmallInteger to determine if a method identified by the selector + exists. It happens that one such method + does exist in class SmallInteger, and this method normally sums the argument of the message with the value represented by the receiving object (in this case 2), and then returns the result to the message sender. However the + method of the SmallInteger class is adapted only to add an integer to integer 2 and is not adapted to add a floating point number such as 3.0 to integer 2. When the SmallInteger object 2 determines that its class method + cannot respond to the message +3.0 carrying a floating point argument, it retransmits the +3.0 message to its superclass, Integer.

When Integer receives the message +3.0, it checks to see if it has a method identified by the + selector, and if it has no such method +, it retransmits the +3.0 message to its superclass, Number. The message continues to be retransmitted up the class hierarchy until a + method for responding to the message is found. However class Integer does have a method +, and this method differs from the + method of SmallInteger because it is capable of adding integers and floating point numbers, although not directly. In response to the +3.0 message, Integer's + method first checks the argument of the +3.0 message to see if it is an integer number. It does this by sending a message "isInteger" to the Smalltalk object 3.0, a member of the Float class, which responds to the isInteger message by indicating that it is not an integer. When Integer method + learns that 3.0 is not an integer, it transmits a message "retry: + coercing 3.0" to the object 2 which looks for a method identified by selector retry:coercing: for implementing the message. Since 2 does not in fact have such a method, it forwards the message to its superclass, Integer. Integer also has no such method, and therefore forwards the retry:coercing: message to its superclass Number.

Number does have a retry:coercing: method which solves the problem of adding the integer 2 to the floating point number 3.0 by converting integer 2 into a floating point number 2.0 and then sending the message +3.0 to the Float object 2.0. The Float object 2.0 then executes its + method which adds 2.0 and 3.0 and returns the floating point number 5.0. In the course of its operation, Number's retry:coercing method initially sends a message "generality" to object 2 and another "generality" message to the object 3.0. The generality methods executed by objects 2 and 3.0 in response to the generality messages cause them to return information to Number's retry:coercing: method which enables it to determine which object, 2 or 3.0, belongs to a more "general" class. According to the concept of "generality", when an object of a class A can be represented by an object of a class B without loss of information about the class A object, but an object of class B cannot be represented by an object of class A without loss of information about the class B object, then class B is more "general" than class A. In this case, the integer number 2 could be converted ("coerced") into a floating point number 2.0 without loss of information about its value but the floating point number 3.0 could not be coerced into an integer 3 without losing information about its value, namely its floating point precision. Thus the Float class is more "general" than the Integer class.

When the retry:coercing: method of the class Number learns that 3.0 belongs to a more general class than 2, it sends object 3.0 a message "coerce: 2" to object 3.0. The coerce: method accessed by object 3.0 responds to this message by returning the floating point number 2.0. The retry:coercing: method in Number then transmits a message "perform: + with: 3.0" to the floating point object 2.0, causing object 2.0 to execute its + method with the argument 3.0, whereby it returns the sum 5.0. This value is forwarded back to the initiator of the original message +3.0 to object 2, thereby completing evaluation of the expression "2+3.0".

From the foregoing discussion, it can be seen that in the Smalltalk system, execution of even an apparently simple procedure such as adding 2 to 3.0 involves a relatively complex sequence of messages and responses which is difficult to visualize. The source code which implements this sequence of operations is not developed as a sequence of instructions corresponding to the sequence of operations, but rather is written and stored in the form of methods grouped within a complex hierarchy of object classes without any obvious indication of the order in which such methods might be executed. Consequently, it is often difficult to predict the behavior of a collection of interactive Smalltalk objects carrying out an operation simply by looking at source code listings of the class methods utilized by the objects. Nor is it easy to determine what objects may be involved in a particular operation.

The present invention relates to an improvement to a prior art Smalltalk "debugger" (as described in *Smalltalk-80, the Interactive Programming Environment* by Adele Goldberg, 1983, Addison-Wesley Publishing Company), a collection of Smalltalk objects which permits a programmer to monitor evaluation of a Smalltalk expression (i.e. to monitor the response of a collection of Smalltalk objects to one or more messages sent thereto) on a "step-by-step" basis wherein each step includes execution of a method or a portion of a method, with expression evaluation being halted after each step so that a user may investigate the current states of variables controlled by Smalltalk objects utilized in the course of evaluating the expression. The prior art debugger also displays a list of messages sent, along with text of methods invoked by the messages. The improvement converts the prior art debugger into a "diagramming debugger" which in addition to performing the aforementioned functions, creates a sequence of Cunningham diagrams illustrating message transmissions occurring in the course of expression evaluation, thereby animating program operation. FIGS. 1-12 illustrate a sequence of displays produced on a computer screen in the course of utilizing the diagramming debugger of the present invention to produce a sequence of Cunningham diagrams animating the evaluation of the expression "2+3.0".

The Smalltalk system permits an operator to transmit a message to an object by utilizing a three-button mouse connected to a computer terminal accessing the Smalltalk system. The mouse moves a cursor on the screen, and buttons on the mouse may be depressed to display menus on the screen listing commands an operator may select. A menu selection is typically made by moving the cursor over a menu item and then releasing the button used to invoke the menu. Thereafter the menu is removed from the screen and response to the selected command is initiated by sending a predetermined message to an object in the Smalltalk system. With reference to FIG. 1, an operator invokes the diagramming debugger of the present invention to monitor evaluation of a Smalltalk expression such as 2+3.0 by typing the line "DiagramDebugger debug: [2+3.0]" into the standard Smalltalk "Workspace" window 12. Thereafter the operator utilizes cursor 14 to select a command 16 "do it" from a Smalltalk standard menu 18 displayed by depressing the middle button of the threebutton mouse while the cursor is within the Workspace window 12.

The Smalltalk system is adapted to "simultaneously" carry out multiple processes such as monitoring the keyboard, monitoring the mouse, managing a clock, running multiple user programs and the like, and the Smalltalk system must establish a new process in order to evaluate the expression 2+3.0 In response to the "do it" command, a "newProcess" message is sent to the standard Smalltalk object BlockContext which creates a new "suspended" process for evaluation of the expression in block [2+3.0], and the Smalltalk compiler compiles the string "DiagramDebugger debug: [2+3.0]" as a method "unboundMethod" of a standard Smalltalk class UndefinedObject. A "suspended" process is a process which is halted until restarted by a "resume" command. The message unboundMethod is then sent to the class UndefinedObject which responds by displaying a window 20 as shown in FIG. 2, labeled "DiagramDebugger" and having a number of panes 21-27.

As previously mentioned, the preferred embodiment of the invention relates to an improvement to a the Smalltalk debugger of the prior art, and this prior art debugger implements panes 21-26 of window 20. The improvement implements pane 27, utilized to display a Cunningham diagram graphically representing messages sent in the course of program execution. Pane 21 displays a "stack" containing lines indicating messages which have been sent but for which methods invoked by the messages have not yet been fully executed. The stack shows the order in which messages were sent, the most recently sent message appearing in the top line of the stack. Each line of the stack includes the name of the class of the message receiving object and the message selector, the receiving object class name and the message selector being separated by a symbol ">>". Pane 22 displays a listing of the Smalltalk code for a method for responding to a message on the stack in pane 21 selected by the operator. The operator can select any message on the stack by using the mouse to point the cursor at the message and then operating a mouse button, the selected message being highlighted. When the operator has made no selection, the message at the top of the stack is automatically selected and highlighted. Panes 23 and 24 comprise a Smalltalk "inspector" permitting inspection of variables controlled by the receiving object of the selected message in pane 21, while panes 25 and 26 comprise a Smalltalk inspector permitting inspection of temporary variables utilized by the method displayed in pane 22. Variable names are displayed in panes 23 and 25, and when an operator uses the mouse to select a variable name in pane 23 or 25, the current value of the variable is displayed in pane 24 or 26, respectively.

The message stack in pane 21 includes two lines. The lower line "[ ] in Blockcontext>>newProcess" indicates the message newProcess was sent to BlockContext and the upper line "[ ] in UndefinedObject>>unboundMethod" indicates that the unboundMethod message was sent to UndefinedObject. The top line of the stack is selected and therefore the text of the unbound- Method method is displayed in pane 22. Pane 23 shows the only pseudovariable "self" associated with the UndefinedObject. Pane 25 is empty since the method unboundMethod in pane 22 utilizes no temporary variables. Panes 24 and 26 are empty because no variable is selected in pane 24 or 25. In pane 22, the first message to be sent (+3.0) by unboundMethod when expression evaluation commences is highlighted. Since the process for evaluating 2+3.0 is currently suspended, the display remains fixed as shown in FIG. 2 until the operator causes the process to resume.

Figure 2:
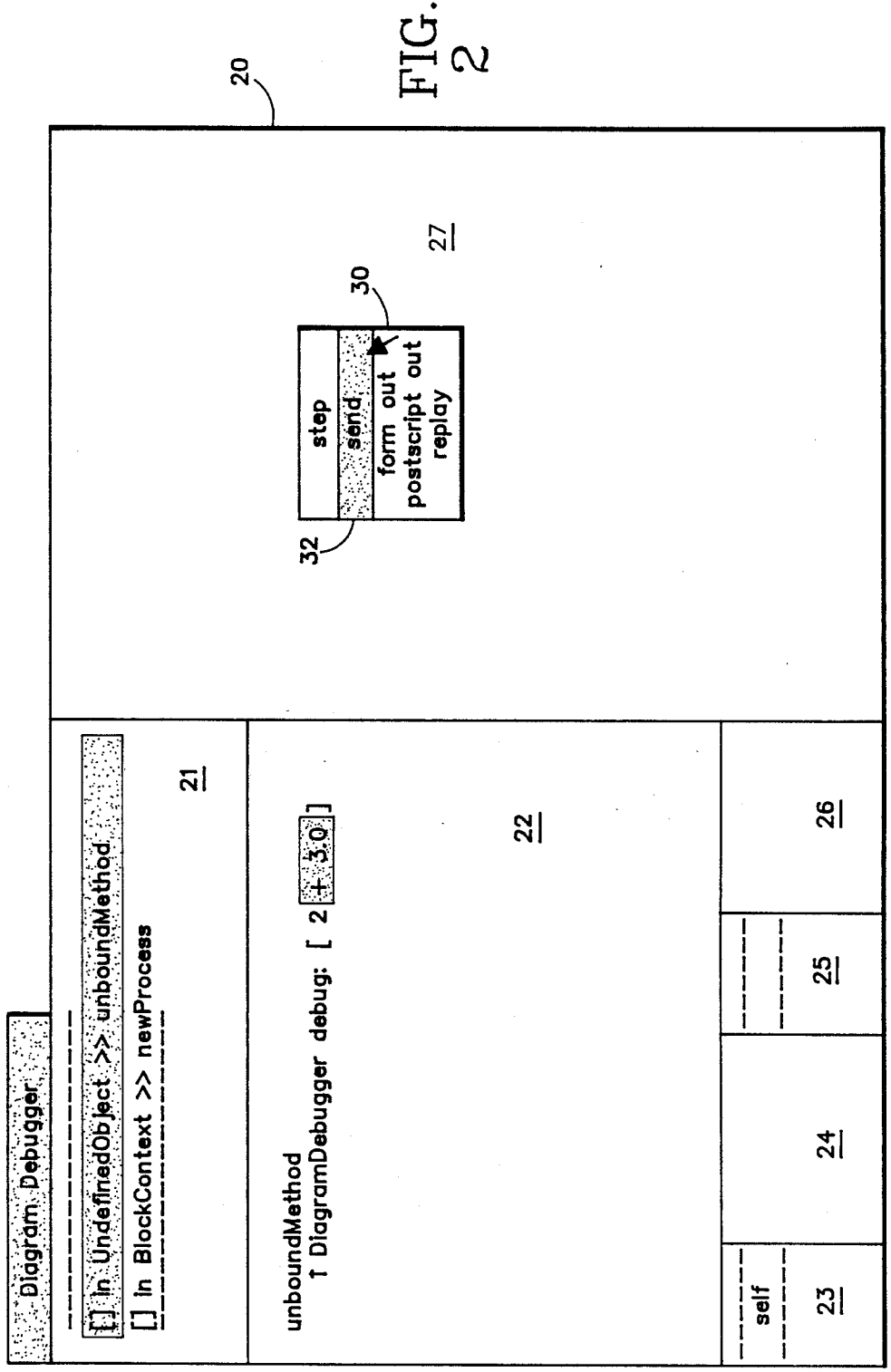
Figure 3:
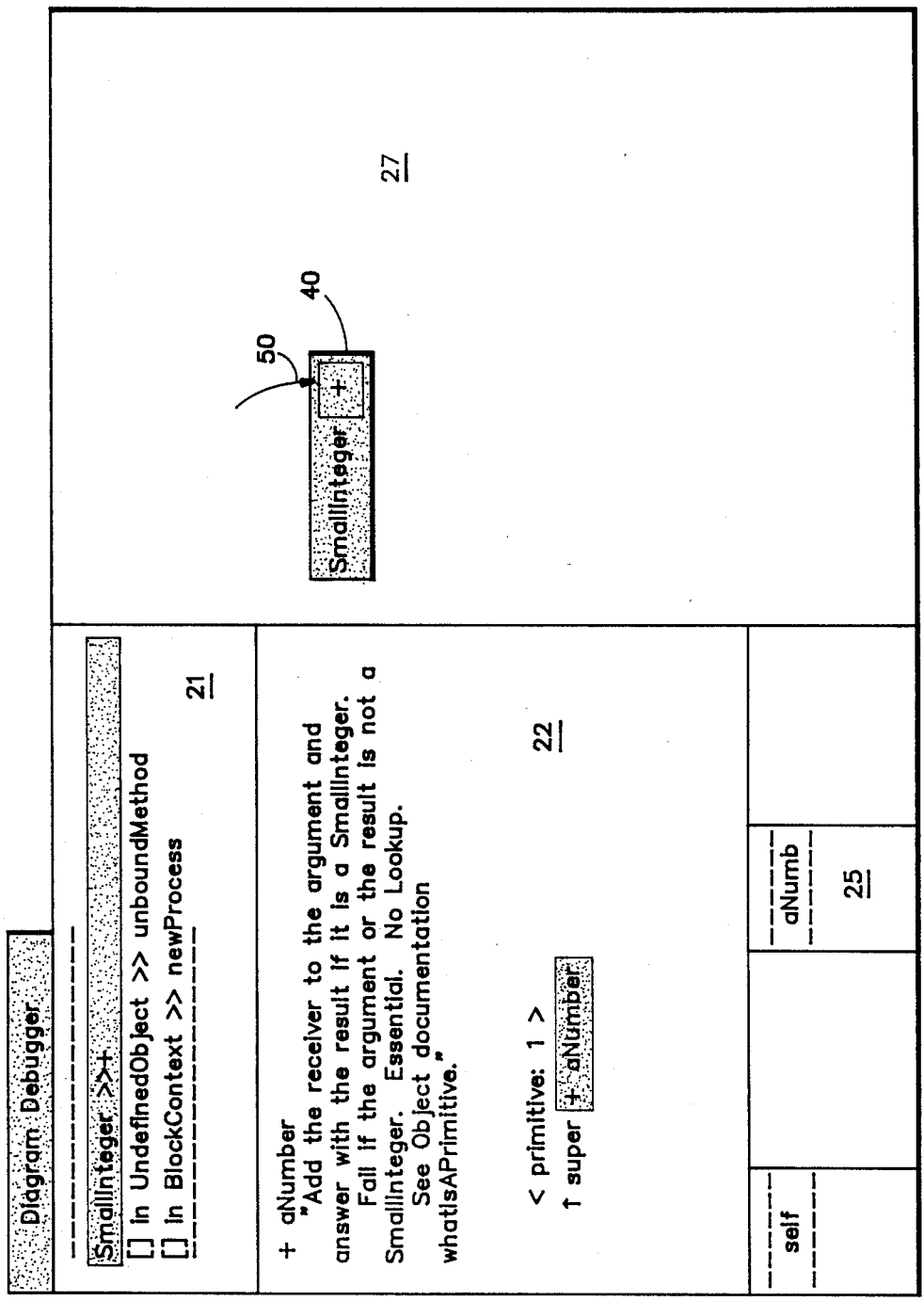

To cause the process to resume, the operator may place the cursor over pane 27, invoke a "diagram" menu 30 as shown in FIG. 2, and then select a command 32 "send" from the menu. The send command causes the message +3.0 to be sent to the object 2. Thereafter, as shown in FIG. 3, the diagramming debugger displays a highlighted box 40 in pane 27 representing the object 2, and an arrow 50 representing the message +3.0 sent to it. Block 40 has one "class line" labeled with the class name SmallInteger of object 2 and containing a "+" symbol, the selector of the SmallInteger class method invoked by message 50. The arrowhead of arrow 50 is directed to the + symbol to indicate the + method of SmallInteger was invoked by the message. The highlighting of box 40 indicates the SmallInteger object 2 represented by box 40 is in the process of responding to a message, but that the process has been interrupted (suspended) by the diagramming debugger. Before displaying box 40 on the screen, the diagramming debugger displays a "corner" cursor in pane 27 in the shape of the upper left corner of a square and the operator utilizes the mouse to move the corner cursor to a desired location on the screen and depresses a mouse button. The diagramming debugger then displays the box 40 on the screen with its upper left corner in the position indicated with the corner cursor and connects arrow 50 to the box.

After the +3.0 message is sent to object 2, the diagramming debugger adds the line "SmallInteger>>+" to the top of the stack in pane 21, displays the text of the method + of class SmallInteger in pane 22, and displays the temporary variable aNumber utilized by the SmallInteger + method in pane 25. The value of the variable aNumber is 3.0, the argument of the +3.0 message. The SmallInteger + method text displayed in pane 22 includes a comment bounded by quote marks describing the function of the method. Following the comment, SmallInteger method + includes a line "<primitive: 1>" indicating the addition function of the + method is to be carried out by an assembly language subroutine (a "primitive"). The next line thereafter is executed if the primitive cannot go to completion. In this example the primitive can only add two integers and therefore cannot add the floating point number 3.0 to the integer 2. The highlighted portion (+ aNumber) of the next line defines the next message to be sent by the SmallInteger object 2. Since the value of the aNumber variable is 3.0, the message +3.0 will be sent to "super", a pseudovariable referring to SmallInteger's super class, Integer.

Figure 4:
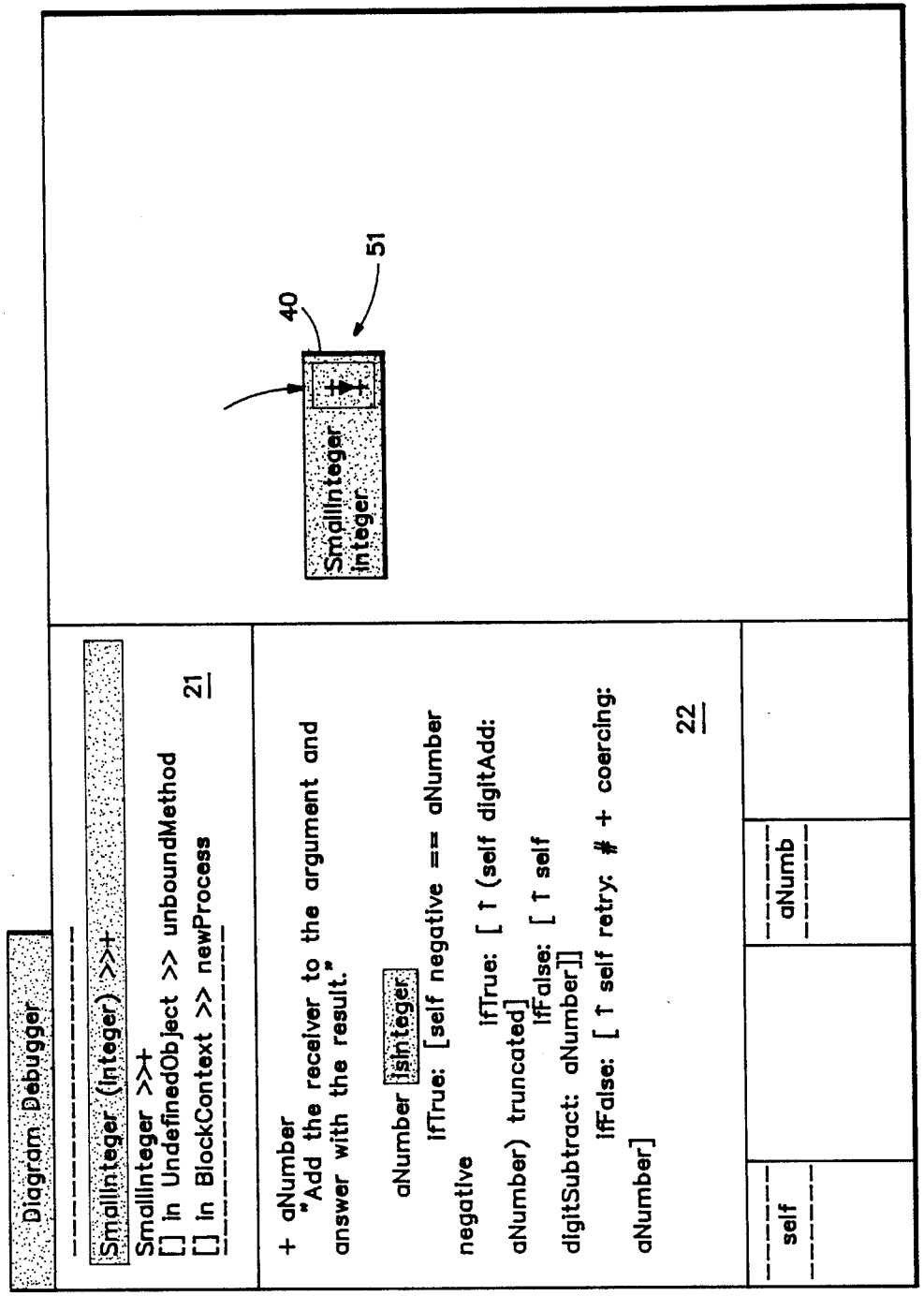

To cause the message +3.0 to be sent to Integer, the operator may again bring forth the display menu 30 of FIG. 2 over pane 27 and select the "send" command. The Cunningham diagram display thereafter changes as shown in FIG. 4. In FIG. 4, box 40 is expanded to include a line labeled with the name Integer of the class receiving the last message and containing another selector symbol + indicating the Integer class method invoked by the message. The + symbol following the SmallInteger class name in box 40 is linked to the + symbol following the Integer class name by a new arrow 51 indicating the + method of SmallInteger sent a message invoking the + method of class Integer. Box 40 suitably flashes (i.e., its highlighting turns on and off) to indicate it is presently responding to a message sent up the class hierarchy of SmallInteger object 2 represented by the box 40. A line "SmallInteger(Integer)>>+" is added to the top of the stack in pane 21 for indicating a message with selector + sent to SmallInteger was forwarded up the class hierarchy to its superclass Integer. The text of the Integer class + method replaces the text of the SmallInteger class method + in pane 22.

Figure 5:
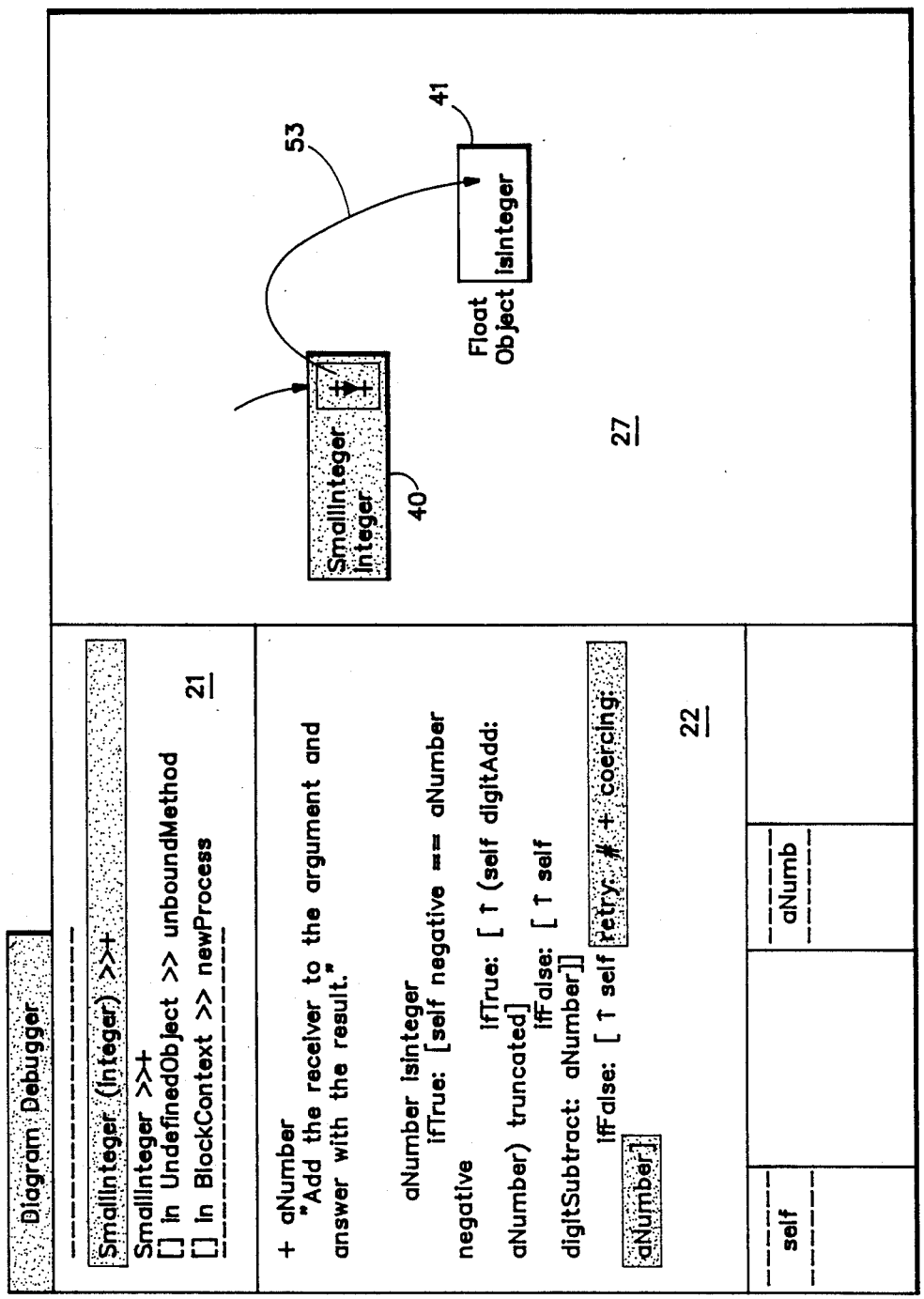

In pane 22 of FIG. 4, the first line of the Integer class + method following a comment enclosed in quotes is "aNumber isInteger". This expression, when executed, causes the highlighted message "isInteger" to be sent to object 3.0, since 3.0 is the value of the temporary variable aNumber. When the operator invokes the command "step" from the pane 27 display menu 30 of FIG. 2, the isInteger message is sent to object 3.0, changing the display as shown in FIG. 5. The step command invoked from menu 30 causes the diagramming debugger to permit process operation to continue until the response to the highlighted message in pane 22 of FIG. 4 is complete, rather than suspending the process prior to execution of the first step of the invoked method as would be the case had the operator selected the "send" command from the display menu.

In the course of responding to the isInteger message Float object 3.0 cannot find an isInteger method in the Float class and therefore routes the isInteger message to Number. But Number also has no isInteger method and therefore transfers the message to Magnitude. Magnitude, also lacking an isInteger method, routes the message to its superclass Object which does have an isInteger method. It so happens in this example the operator did not want the diagramming debugger to step through all the intermediate message sends required to produce a response to the isInteger message and therefore the operator selected the "step" command rather than the "send" command from the display menu. In response to the step command, the Diagram debugger displayed in pane 27 of FIG. 5 a new box 41 showing only two class lines labeled "Float" and "Object", the Float line being empty (i.e., containing no method selector) and the Object line containing the selector isInteger. A new arrow 53 is added to the display, originating on the + selector in the Integer class line of box 40 and terminating on the isInteger selector of the Object line of box 41. The display indicates that the + method of object Integer sent a message to the Float object 3.0, but that there was no method in class Float to respond to the message isInteger. Therefore the message was transferred up Float's class hierarchy until, at last in class Object, a method for responding to the isInteger message was found.

Had the operator chosen the "send" command, an isInteger selector would be shown after Float and arrow 53 would have been directed to that isInteger selector. The Object line of box 41 would no be displayed and the process would be suspended just after Float received the isInteger message. In order to complete the response to the isInteger message, the operator could select the send command several times and box 41 would show a sequence of messages sent up the class hierarchy to Object. However since the operator initially selected the step command, all of the intermediate messages sent to classes between Float and Object, as well as class lines representing the intermediate classes, are omitted from box 41 and a single message 53 is shown as directly invoking Object's isInteger method. The use of the step command thereby permits an operator to prevent intermediate messages transmitted in the course of responding to an initial message from being displayed, while the use of the send command permits all intermediate messages to be displayed. Thus the operator may determine which intermediate messages are to be displayed in the Cunningham diagram and which intermediate messages are to be omitted, thereby creating a Cunningham diagram showing an "outline" of message sends or showing detailed intermediate message sends when the details of the intermediate message sends are of interest.

When a message is sent to an object which has not previously received a message, a new box is created in the Cunningham diagram of pane 27. However when an object represented by a box in the Cunningham diagram forwards a message up its class hierarchy, rather than to an object outside its class hierarchy, a new box is not created for the receiving object, but new class lines are added to its existing box, the new class lines indicating the higher order class methods accessed For example, when the SmallInteger + method of box 40 sent message 51 to Integer, Integer was not represented by a separate box because message 51 was sent to Integer in its capacity as SmallInteger's superclass in order to access its + method when the method of the SmallInteger class failed, and not to an object of class Integer separate and distinct from SmallInteger object 2. However when the Integer method + sent the isInteger message to Float object 3.0, a new box 41 was created to represent 3.0 since 3.0 is a newly accessed object That message was ultimately referred to the Object class in Float's class hierarchy, represented as an additional class line in box 41. Thus a box not only represents an object and indicates methods of its class invoked in response to a message but also indicates the higher order class methods accessed by the object in responding to the message. Thus one may easily discern from the Cunningham diagram in pane 27 of FIG. 5 that a message was sent to a SmallInteger object, that SmallInteger method + responded by invoking the + method of its superclass Integer, and that the Integer method + sent an isInteger message to a Float object. It can also be seen the Float object had no class method isInteger, and no intermediate class between Float and Object had such a method, but class Object did indeed have such a method which responded to the message. It is apparent isInteger fully responded to the message because box 40, rather than box 41, is highlighted.

A line describing the isInteger message is not added to the stack in pane 21 of FIG. 5 because the response to that message is complete, the stack including only those messages to which the system has not fully responded. By invoking the step command, the operator indicated he was not interested in the details of what Float object 3.0 did in responding to isInteger, and therefore the diagramming debugger allowed the response to isInteger to go to completion without halting expression evaluation. Thus the method displayed in pane 22 did not change because the system is still in the process of executing the +3.0 message sent to class Integer, the last message sent for which a response is not yet complete.

According to the code shown in pane 22 for the Integer class method +, the next message is to be sent by the highlighted code with selector "retry: coercing:". This message is to be sent to "self" the pseudovariable which refers to SmallInteger, and the operator uses the send command to send this message to SmallInteger. But SmallInteger has no method for responding to the message, so the message is transferred up its class hierarchy to class Number. This is illustrated by the next Cunningham diagram display shown in pane 27 of FIG. 6. A class line labeled Number is added to box 40 and includes the selector retry:coercing:. An arrow 54 is added to the diagram showing that the last message was sent by Integer's + method and invoked Number's retry:coercing: method. The message line SmallInteger(Number)>>retry:coercing: is added to the stack in pane 21 to show the retry:coercing message sent to SmallInteger is being executed by its superclass Number. The text of the Number class method retry:coercing: is displayed in pane 22. The entire text of the retry:coercing: method is too long to be displayed in pane 22, but as lines of code in the method are executed, the text display suitably scrolls upward.

The first line of code of the retry:coercing: method, after the comment enclosed in quotes, sends a message "== #=" to the object indicated by the variable aSymbol, in this case the Smalltalk object an argument of the retry:coercing: message. The == method of object + causes the object + to return an indication of whether or not it is an "=" symbol, which of course it is not. In this particular example, the operator has decided he doesn't want the diagramming debugger to update the Cunningham diagram of pane 27 to display a graphical representation of the message == #= to the object + Furthermore, the operator has decided he does not want response to the == #= message to be halted so as to detail any intermediate messages sent in response to the == #= message. Therefore the operator invokes a step command from a "nondisplay" menu 60 invoked from pane 21 shown in FIG. 6.

Figure 6:
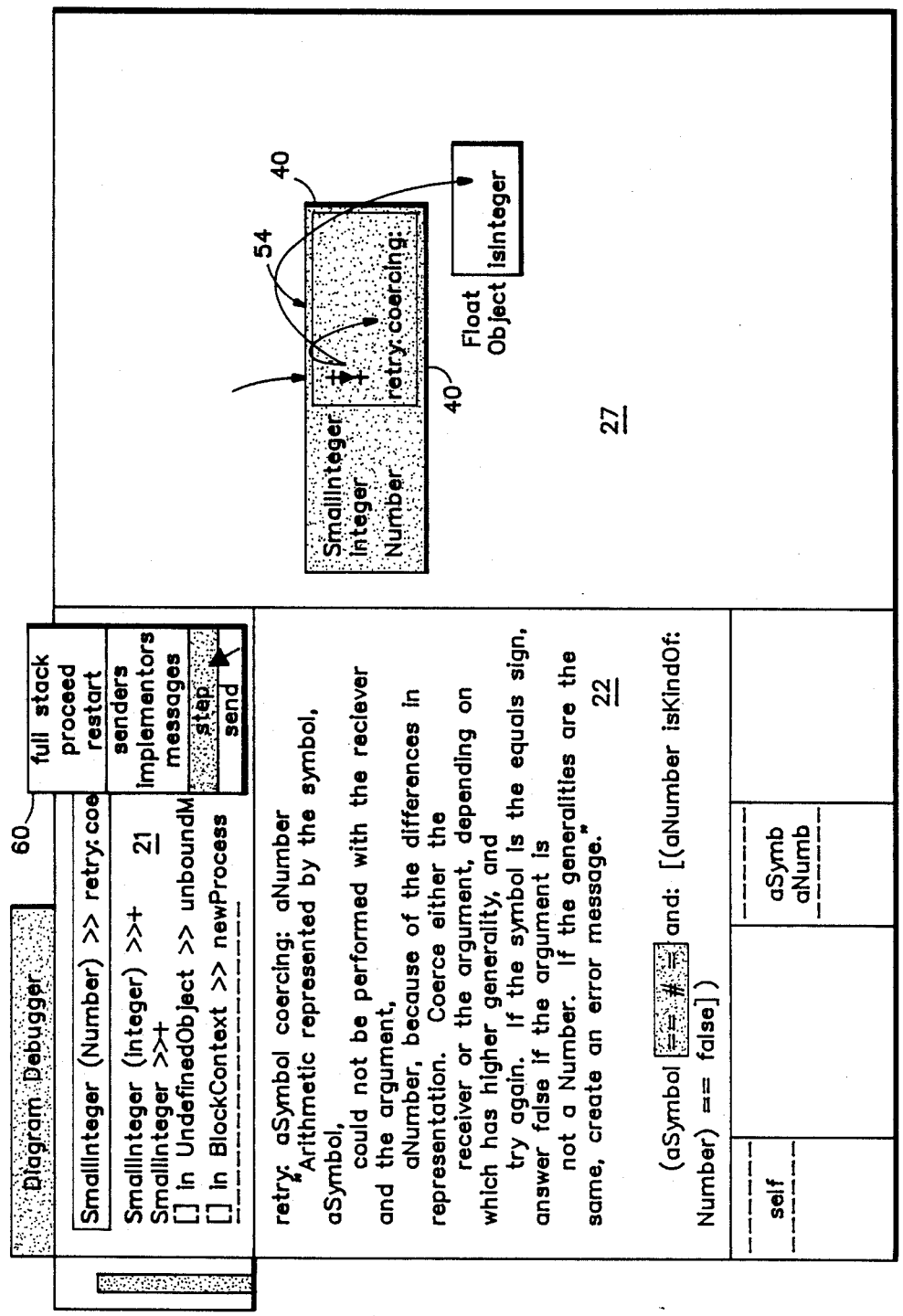

The "step" command of nondisplay menu 60 of FIG. 6 also causes the process to completely respond to a selected message before halting and waiting for another command from the operator. However, when the operator invokes the step command from nondisplay menu 60, no change is made to the Cunningham diagram of pane 27. Similarly, while a "send" message invoked from nondisplay menu 60 causes the selected message to be sent and halts the process immediately before executing any portion of a method invoked by the message, nothing is added to the Cunningham diagram to illustrate a message send which may have occurred in response to the send command. Thus, the operator may prevent selected operations from being graphically illustrated by using a step or send command from nondisplay menu 60 invoked from pane 21 rather than from the display menu invoked from pane 27. Accordingly, by appropriately choosing step and send commands from the nondisplay menu or from the display menu, the operator may construct a Cunningham diagram in pane 27 illustrating only those operations which he considers to be of interest and including any desired level of intermediate message send detail.

Figure 7:
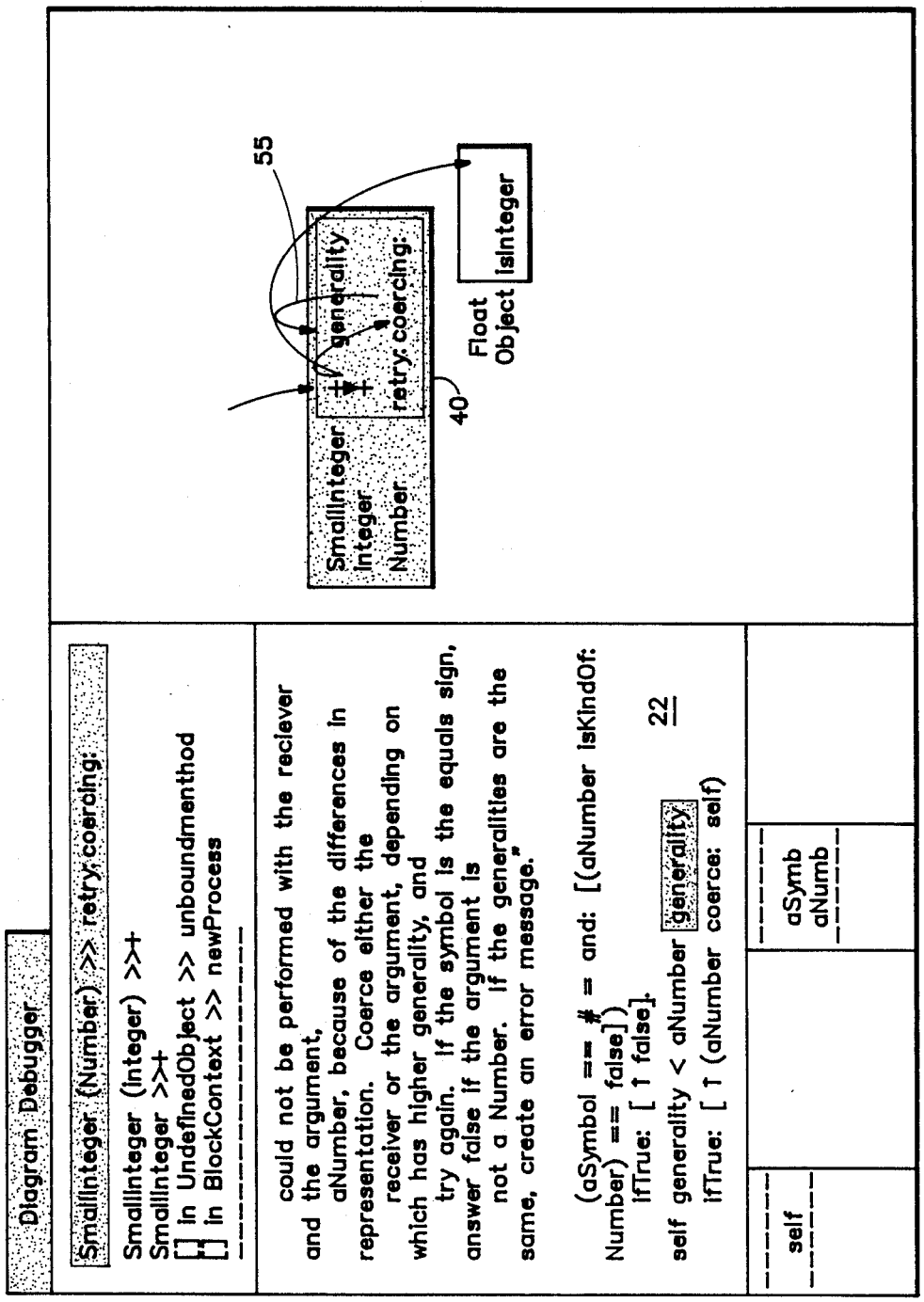

After the operator has stepped the next message (isKindOf:) sent by the retry:coercing: method listed in pane 22 utilizing the step command of nondisplay menu 60, and has stepped the next message thereafter (generality) utilizing the step command the display menu, the diagramming debugger window appears as shown in FIG. 7. The last message, generality, was sent by the Number method retry:coercing: to SmallInteger as indicated by the "generality" selector added to box 40 on the SmallInteger line following the + selector. The message is indicated by an arrow 55 from method retry:-coercing: to the generality selector and this method causes SmallInteger to return a value indicating its relative generality. Note that when a second method (e.g. generality) of a particular class object (e.g. SmallInteger) is invoked by an object sometime after a first method of the class (e.g. +) has been invoked, the selector for the second method is displayed on the same class line as the selector for the first method.

Figure 8:
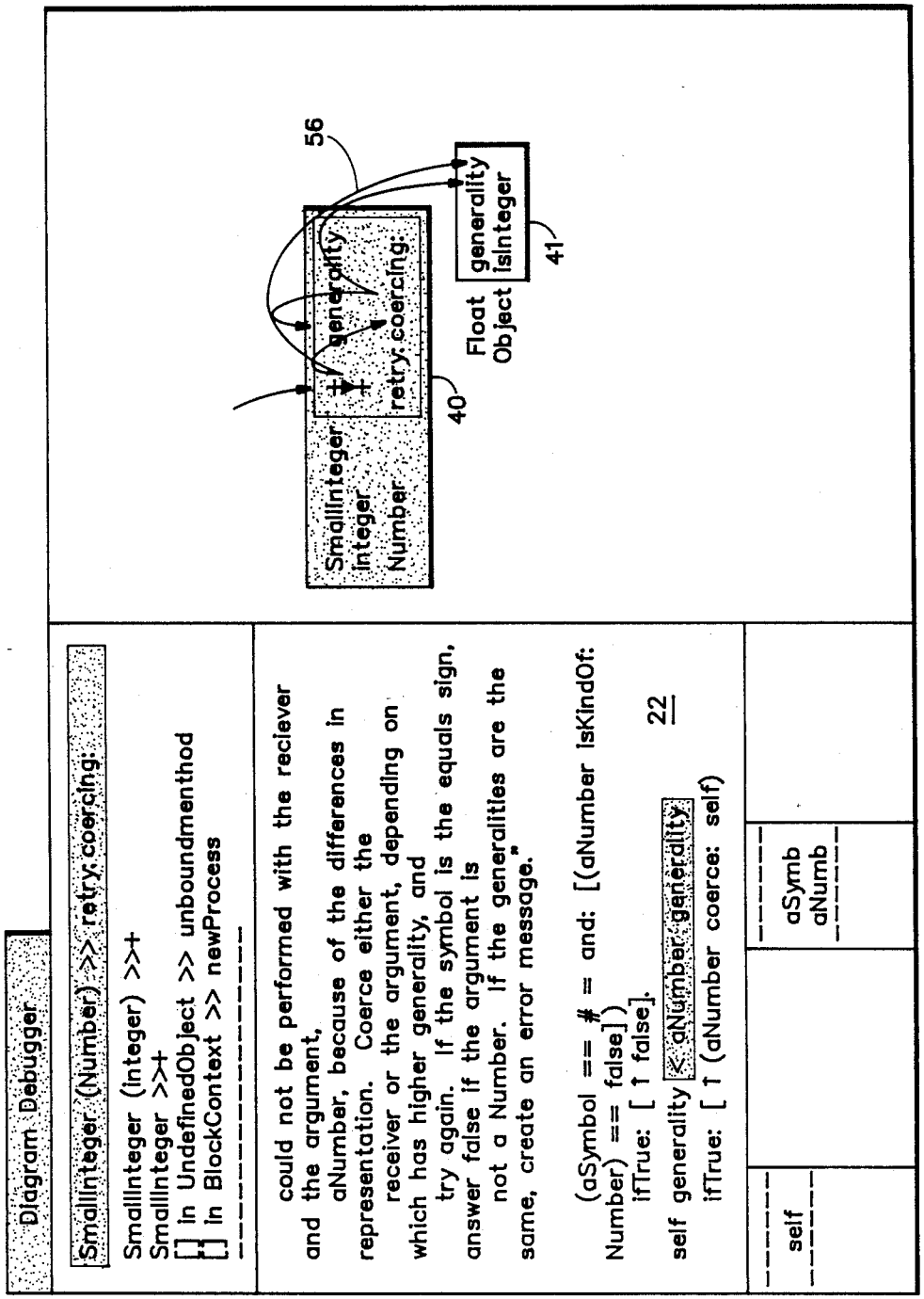

The next message to be sent, highlighted in pane 22, is also "generality" but this message is to be sent to the object 3.0, the value of variable aNumber. FIG. 8 shows the resulting Diagram Debugger display after the operator has display stepped this message. The method selector "generality" has been added to the Float line of box 41 and an arrow 56 has been added pointing from the retry:coercing: method of box 40 to the generality method of box 41, thereby showing the path of the message which invoked the generality method of Float.

Figure 9:
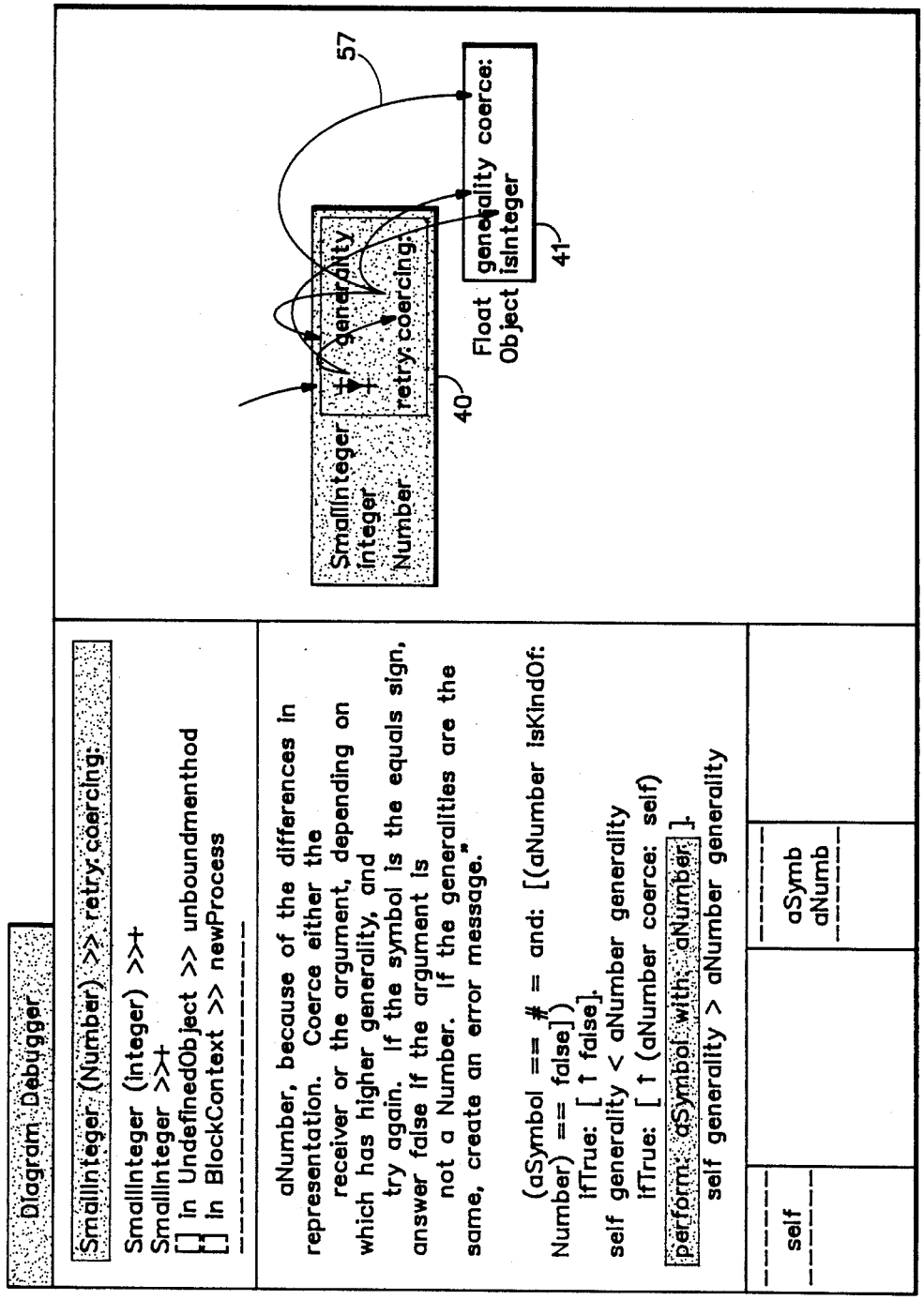
Figure 10:
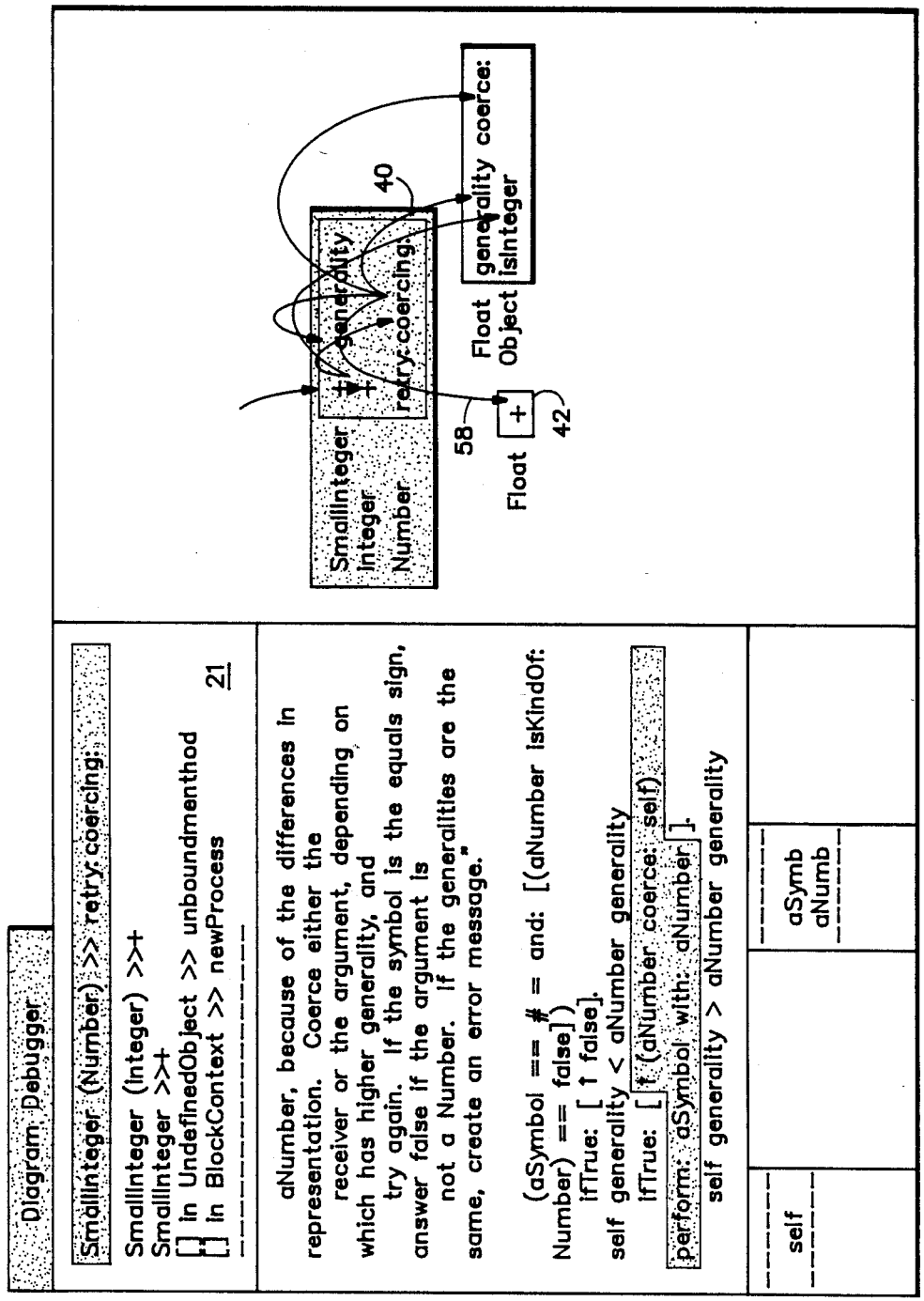

The next step to be performed, comparing the generality of "aNumber" (3.0) to the generality of "self" (2), is highlighted in pane 22 of FIG. 8. When the operator invokes a step command from either menu, this step does not affect the display since no message is sent. In the next following step, the message coerce: 2 is sent to aNumber (Float object 3.0) and FIG. 9 shows the state of the display after the operator has invoked the display menu step command. The message selector coerce: is added to the Float class line of box 41 and a new arrow 57 is directed from retry:coercing: in box 40 to coerce: in box 41. The coerce: method of class Float returns the value 2.0. In the next step, the message "perform: + with: 3.0" is sent to Float object 2.0. FIG. 10 illustrates the display after this message is sent. A new box 42, representing Float object 2.0, is added to the display with one class line labeled Float containing the method selector +, and with a message arrow 58 directed from method selector retry:coercing: in box 40 to selector + in box 42. Even though the Float object 2.0 and the float object 3.0 are of the same class, they are represented by different boxes since they are different objects. In response to the +3.0 message, the + method of Float object 2.0 returns the value 5.0. Thereafter Number's retry:coercing: method returns the value of 5.0 to the initial sender of the message +3.0 by way of Integer and SmallInteger, thereby completing the response to the original message. By that time, the top three lines of the stack in pane 21 of FIG. 10 will have been removed because the system has fully responded to the messages indicated in these lines.

In addition to the step and send commands, the nondisplay menu 60 of FIG. 6 includes a "full stack" command, which causes all messages on the stack of pane 21 to be displayed rather than just the top few. A "proceed" command closes the diagramming debugger and causes expression evaluation to proceed from its last point of interruption without further interruption, while a "restart" command closes the diagramming debugger and causes evaluation to start from the beginning of the currently selected method appearing in pane 22. A "senders" command opens a Smalltalk message-set "browser" window, permitting an operator to investigate all methods that include an expression in which the currently selected message in pane 21 is sent, and an "implementors" command opens a "message-set" browser window on all methods that implement the currently selected message. A "messages" command opens a menu of all messages sent in the method of pane 22, and choosing one of these menu items creates a message-set browser on all of its implementors.

The sequence of Cunningham diagrams shown in panes 27 of FIGS. 3-10 illustrates the evaluation of the expression 2+3.0 by showing the sequence of messages sent in the course of evaluating the expression. The display menu 30 of FIG. 2 includes a "replay" command which causes the sequence of Cunningham diagrams created up to the present point of expression evaluation to be displayed sequentially, thereby creating an animated "moving" picture of expression evaluation. A Cunningham diagram sequence is useful not only in debugging object-oriented software, is it also useful or documenting object-oriented software by graphically illustrating how a collection of objects work together to carry out a particular operation in a manner that it easy to follow and understand.

Figure 11:
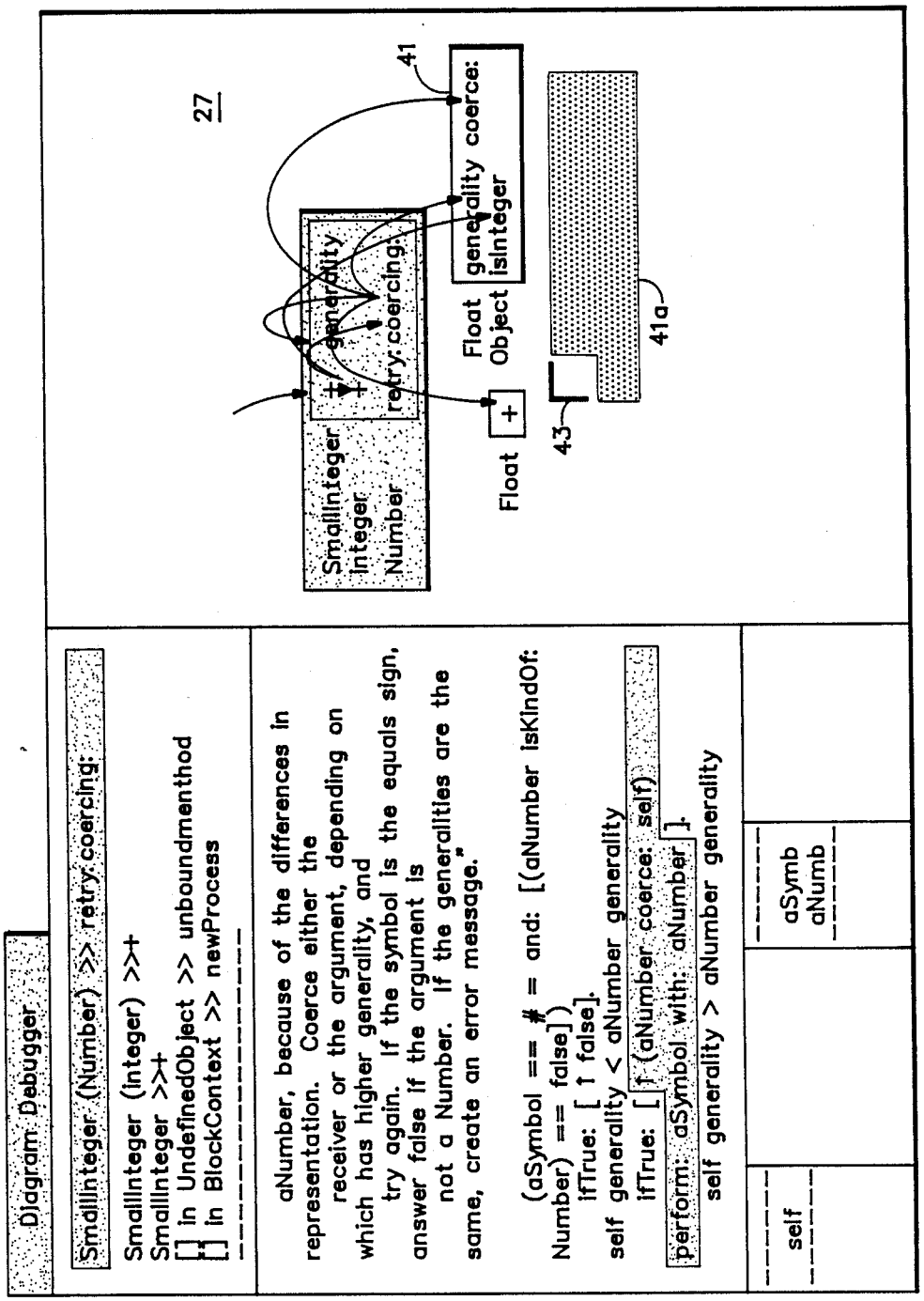
Figure 12:
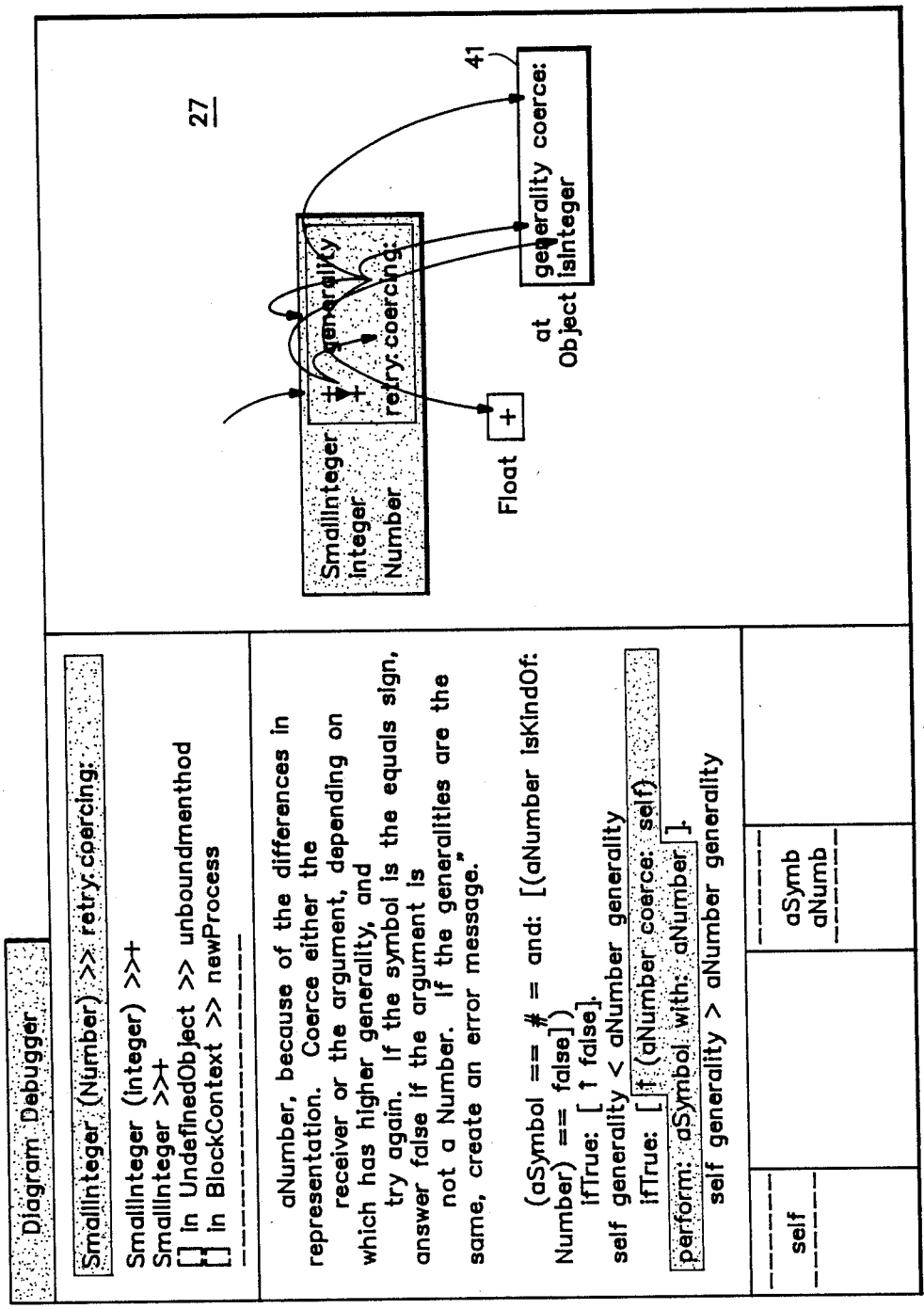

At any point during diagramming debugger operation, the current Cunningham diagram of pane 27 can be saved either by selecting a "form out" command in the diagram menu to obtain a bit map printout of the diagram, or by selecting a "postscript out" command in the diagram menu to obtain a type set printout of the display. Prior to printing a Cunningham diagram, an operator may wish to relocate or remove selected boxes in the diagram. When the operator uses the cursor and a mouse button to select a box in the Cunningham diagram, a shadowed outline of the box is established on the screen with a corner cursor at its upper left corner, as shown in FIG. 11. In FIG. 11, the operator has selected box 41 and an outline 41a has appeared on the screen near box 41 with a corner cursor 43 at its upper left corner. The operator may then use the mouse to drag cursor 43 anywhere within pane 27. Thereafter, when the operator depresses a mouse button, box 41 is relocated to the position indicated by outline 41a, and all arrows to box 41 are redrawn accordingly as shown in FIG. 12. The operator may also remove a box from the display by using the corner cursor to drag its outline out of pane 27. In such case, the diagramming debugger also removes all of the arrows connected to the removed box along with any selectors in the remaining boxes which no longer have arrows connected to them.

A software listing of new Smalltalk classes which implement the present invention is included in Appendix I to this specification. These new Smalltalk classes create, edit, replay and print out the Cunningham diagram displays of pane 27 of the Diagram Debugger window in response to commands from the diagram menu and forward step and send command inputs invoked from the pane 27 diagram menu to the standard Smalltalk debugger which controls the displays in panes 21-26 of the Diagram Debugger window in response to the forwarded step and send commands and in response to the nondisplay menu.

A new class DiagramDebugger includes instance methods which initiate response to the diagram menu step and send commands and includes a class method which opens the Diagram Debugger window. A new DiagramController class includes methods for monitoring the activity of the mouse and the mouse buttons when the cursor is in pane 27 and for creating the display menu invoked in pane 27. One instance of a new class DiagramObject is instantiated for the displayed representation of each box, class line, or selector in the Cunningham diagram. Instance methods of class DiagramObject are invoked to provide instructions for drawing, emphasizing ("highlighting"), or deemphasizing a particular object, and also to provide instructions for creating the image of the object on the type set hard copy of the Cunningham diagram. An object of new class DiagramSelector is instantiated for each arrow in the Cunningham diagram and includes methods providing instructions for drawing or removing the arrow and for drawing the arrow when creating a type set copy of a Cunningham diagram. A Diagram class accesses the collection of DiagramObject and DiagramSelector objects corresponding to the boxes, classes, selectors, and arrows in the currently displayed Cunningham diagram and includes methods for determining which of these objects are to be added, removed, selected, emphasized, deemphasized or flashed, methods for redisplaying objects which may have been covered by another window, for responding to pane 27 menu messages, and methods utilized when producing printouts of the diagram. An instance of a new DiagramView class coordinates the display and type set printout of the Cunningham diagram.

Thus, according to the present invention, a message transmission in the course of executing an object-oriented program is graphically illustrated by displaying a representation of a "sending" method (procedure) which transmitted the message, a representation of a "receiving" method invoked by the message, and a representation of the message (an arrow) graphically linking the representations of the sending and receiving methods. It is understood that while in the preferred embodiment of the invention, each sending and receiving method is represented in the form of a selector contained in a box referenced by the class within which the method is grouped, such methods could be graphically represented in other ways. Similarly it should be understood that messages could be represented by symbols other than arrows which serve to graphically link sending and receiving method representations.

Thus, while a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

APPENDIX I
SOFTWARE LISTING
Copyright (c) 1986, Tektronix, Inc.
All rights reserved.

_____ DiagramDebugger _____

Debugger subclass: #DiagramDebugger      DiagramDebugger
    instanceVariableNames: 'diagram '
    classVariableNames: ''
    poolDictionaries: ''
    category: 'Diagrams'
DiagramDebugger comment:
'I am a Debugger which has the additional protocol of recording steps and sends in a Diagram. To record a message send I duplicate the current context and have it interpreter the next instruction for the diagram. This context is then discarded and the usual Debugger operation takes place.' accessing diagram: aDiagram      diagram:
        diagram ← aDiagram stack manipulation diagramSend      diagramSend
        *"See Debugger/send."* self checkContextSelection.
        processHandle interrupted ifFalse: [processHandle topContext push: processHandle proceedValue].
        processHandle interrupted: true. *"simulation leaves same state as interrupting"*
        context stepToSendOrReturn.
        (context ~~ processHandle topContext) | context willReturn
            ifFalse:
                [context copy interpretNextInstructionFor: diagram.
                self resetContext: context step.

context stepToSendOrReturn]

diagramStep  
*"See Debugger/step."*

| currentContext |  
self checkContextSelection.  
processHandle interrupted ifFalse: [processHandle topContext push: processHandle proceedValue].  
processHandle interrupted: true. *"simulation leaves same state as interrupting"*  
context == processHandle topContext  
    ifTrue:  
        [currentContext ← context.  
        currentContext stepToSendOrReturn.  
        currentContext willReturn  
            ifTrue:  
                [currentContext ← currentContext step.  
                currentContext stepToSendOrReturn.  
                self resetContext: currentContext]  
            ifFalse:  
                [currentContext copy interpretNextInstructionFor: diagram.  
                currentContext completeCallee: currentContext step.  
                self changed: #pc.  
                self updateInspectors]]  
    ifFalse:  
        [*"Have to complete any stuff called from here"*  
        context completeCallee: processHandle topContext.  
        self resetContext: context]

---

DiagramDebugger class

DiagramDebugger class  
    instanceVariableNames: ''

Instance creation debug: aBlock  
    | debugger process | process ← aBlock newProcess.  
    self openFullViewOn: (self interruptProcess: process) label: 'Diagram Debugger'.  
    Cursor normal show.  
    Processor terminateActive

*"DiagramDebugger debug: [3 + 4.0]"* openFullViewOn: aDebugger label: aString  
    *"Answer an instance of me on the model, aDebugger.*  
    *The label is aString. Do not terminate the current active process."*

| topView |  
    aDebugger openInspectors.  
    topView ← BrowserView model: aDebugger label: aString minimumSize: 400@230.  
    topView addSubView:  
        (SelectionInListView on: aDebugger printItems: true oneItem: false  
            aspect: #context change: #context: list: #contextList  
            menu: #contextMenu initialSelection: #context)  
        in: (0@0 extent: 0.5@0.2) borderWidth: 1.  
    topView addSubView:  
        (CodeView on: aDebugger aspect: #text change: #acceptText: from:

```
            menu: #textMenu initialSelection: nil)
        in: (0@0.2 extent: 0.5@0.6) borderWidth: 1.
InspectorView view: aDebugger receiverInspector
        in: (0@0.8 extent: 0.25@0.2) of: topView.
InspectorView view: aDebugger contextInspector
        in: (0.25@0.8 extent: 0.25@0.2) of: topView.
topView addSubView:
        (DiagramView debugger: aDebugger)
        in: (0.5@0.0 extent: 0.5@1) borderWidth: 1.
topView controller openNoTerminate.
↑topView
```

_____ DiagramController _____

Controller subclass: #DiagramController                                    DiagramController instanceVariableNames: ''
    classVariableNames: ''
    poolDictionaries: ''
    category: 'Diagrams'
DiagramController comment:
'I contain commands to edit the diagram which is my model, and pop up a menu on the yellow mouse button.' moving moveObject: aDiagramObject                                                  moveObject:
    | p | sensor cursorPoint: aDiagramObject location.
    Cursor blank showWhile:
        [p ← (Rectangle originFromUser: aDiagramObject boundingBox extent) origin].
    (view containsPoint: p)
        ifTrue: [aDiagramObject location: p]
        ifFalse: [model removeObject: aDiagramObject object].
    view display control activity controlActivity                                                             controlActivity
    sensor redButtonPressed
        ifTrue: [↑self redButtonActivity].
    sensor yellowButtonPressed
        ifTrue: [↑self yellowButtonActivity]

redButtonActivity                                                           redButtonActivity
    | obj |
    obj ← model selectedObject.
    obj notNil
        ifTrue: [self moveObject: obj]

yellowButtonActivity                                                        yellowButtonActivity
    | index menu |
    menu ← model yellowButtonMenu.
    index ← menu startUp.
    index = 0 ifTrue: [↑self].
    model perform: (menu selectorAt: index)

_____ Diagram _____

Object subclass: #Diagram                                                   Diagram

```
instanceVariableNames: 'debugger locatedObjects unRootedArrows '
classVariableNames: ''
poolDictionaries: ''
category: 'Diagrams'
```
Diagram comment:
'I represent a diagram, composed of DiagramObjects. I have a pointer to the debugger from which I am being constructed, and I keep track of unrooted arrows. My protocol includes displaying, gathering theinformation about a pending message send from the debugger, and editing. ' initialization debugger: aDiagramDebugger                                                                debugger:
    debugger ← aDiagramDebugger.
    locatedObjects ← Dictionary new.
    debugger addDependent: self.
    debugger diagram: self release                                                                                    release
    debugger removeDependent: self.
    debugger diagram: nil.
    super release emphasizing deemphasize: aContext                                                                      deemphasize:
    aContext == nil
        ifTrue: [↑self].
    (locatedObjects
        at: aContext receiver
        ifAbsent: [↑self]) deemphasize emphasize: aContext                                                                        emphasize:
    aContext == nil
        ifTrue: [↑self].
    (locatedObjects
        at: aContext receiver
        ifAbsent: [↑self]) emphasize flashReceiver: receiver                                                                    flashReceiver:
    Display flash: (locatedObjects at: receiver) boundingBox.

updating update: aSymbol                                                                            update:
    "Transcript cr; show: (Array with: aSymbol with: debugger context) printString."
    aSymbol == #context
        ifTrue: [self updateContext]

updateContext                                                                              updateContext
    locatedObjects do: [:each | each deemphasize].
    self emphasize: debugger context editing addReceiver: receiver selector: aSymbol super: isSuper                                     addReceiver:selector:super:
    | label aPoint d receiverClass |
    receiverClass ← (isSuper
        ifTrue: [debugger context mclass superclass]
        ifFalse: [receiver class])
            whichClassIncludesSelector: aSymbol.
    receiverClass isNil

```
            ifTrue: [↑self error: receiver printString, ' does not understand ', aSymbol].
    (locatedObjects includesKey: receiver)
            ifTrue: [self flashReceiver: receiver.
                (locatedObjects at: receiver)
                    addSelector: aSymbol
                    class: receiverClass; display.
            ↑self
                connectReceiver: receiver
                selector: aSymbol
                class: receiverClass
                super: isSuper].
    label ← (receiver printString contractTo: 30) asDisplayText form.
    Cursor blank showWhile:
        [label follow: [aPoint ← Sensor cursorPoint]
            while: [Sensor noButtonPressed]].
    (d ← DiagramObject of: receiver at: aPoint)
            addSelector: aSymbol
            class: receiverClass.
    d display.
    locatedObjects at: receiver put: d.
    self
        connectReceiver: receiver
        selector: aSymbol
        class: receiverClass
        super: isSuper.
    Sensor waitNoButton
``` addUnrootedArrow:selector:class:

```
addUnrootedArrow: anObject selector: aSymbol class: aClass
    | aDiagramSelector |
    aDiagramSelector ← (locatedObjects at: anObject)
        getSelector: aSymbol
        class: aClass.
    aDiagramSelector isNil
            ifFalse: [unRootedArrows add: aDiagramSelector].
    self displayUnRootedArrows
``` connectReceiver:selector:class:super:

```
connectReceiver: receiver selector: aSymbol class: aClass super: isSuper
    | aDiagramObject otherSelector | aDiagramObject ← locatedObjects
        at: debugger context receiver
        ifAbsent: [↑self
            addUnrootedArrow: receiver
            selector: aSymbol
            class: aClass].
    otherSelector ←
        isSuper
            ifTrue: [self
                connectSuperSelector: aSymbol
                class: debugger context mclass
                toClass: aClass
                forObject: aDiagramObject]
            ifFalse: [self
                connectSelector: debugger context selector
                class: debugger context mclass
                to: (locatedObjects at: receiver)
                selector: aSymbol
                class: aClass
                forObject: aDiagramObject].
```

```
otherSelector isNil
    ifTrue: [↑self
        addUnrootedArrow: receiver
        selector: aSymbol
        class: aClass].
(locatedObjects at: debugger context receiver) displayMessages
``` connectSelector: aSymbol class: aClass to: aDiagramObject selector: anotherSymbol class: anotherClass forObject: anotherDiagramObject  
    connectSelector: aSymbol  
    class: aClass  
    to: aDiagramObject  
    selector: anotherSymbol  
    class: anotherClass

*connectSelector:class:to:selector:class:forObject: anotherDiagramObject* connectSuperSelector: aSymbol class: aClass toClass: anotherClass forObject: aDiagramObject  
    aDiagramObject  
        connectSuperSelector: aSymbol  
        class: aClass  
        toClass: anotherClass

*connectSuperSelector:class:toClass:forObject:* removeObject: anObject  
    | diagO |  
    diagO ← locatedObjects  
        detect: [: aDiagramObject | aDiagramObject object == anObject]  
        ifNone: [↑self].  
    locatedObjects removeKey: anObject.  
    diagO selectors  
        do: [: aCollection | aCollection  
            do: [: selector | self removeReferencesTo: selector]]

*removeObject:* removeSelector: aSymbol class: aClass object: anObject  
    | diagO aDiagramSelector |  
    diagO ← locatedObjects at: anObject ifAbsent: [↑self].  
    aDiagramSelector ← (diagO selectors at: aClass) detect: [: sel | sel selector == aSymbol].  
    self removeReferencesTo: aDiagramSelector.  
    diagO removeSelector: aDiagramSelector.

*removeSelector:class:object:* displaying display  
    self displayWithDelta: 0@0

*display* displayMessages  
    locatedObjects do: [: e | e displayMessages]

*displayMessages* displayObjectsWithDelta: aPoint  
    locatedObjects do: [: e | e displayWithDelta: aPoint]

*displayObjectsWithDelta:* displayUnRootedArrows  
    unRootedArrows isNil ifTrue: [unRootedArrows ← OrderedCollection new].  
    unRootedArrows do:  
        [: aDiagramSelector | aDiagramSelector displayUnRootedArrow]

*displayUnRootedArrows* displayWithDelta: aPoint  
    self displayObjectsWithDelta: aPoint.  
    self displayMessages.  
    self displayUnRootedArrows

*displayWithDelta:* selecting selectedObject
    ↑locatedObjects
        detect: [: e | e boundingBox containsPoint: Sensor cursorPoint]
        ifNone: [↑nil]

menu accessing yellowButtonMenu
    ↑ActionMenu
        labels: 'step\send\form out\postscript out' withCRs
        lines: #(2)
        selectors: #(step send printOut postScriptOut)

menu messages send
    debugger diagramSend step
    debugger diagramStep private removeReferencesTo: aDiagramSelector
    locatedObjects
        do: [: aDiagramObject |
            aDiagramObject removeReferencesTo: aDiagramSelector].
    unRootedArrows remove: aDiagramSelector ifAbsent: []

send: selector super: isSuper numArgs: numArgs
    "Figures out who the receiver of the next message will be."

| receiver aContext args |
    aContext ← debugger context copy.
    args ← OrderedCollection new: numArgs.
    numArgs timesRepeat: [args addLast: aContext pop].
    receiver ← aContext pop.
    (#(perform: perform: with: perform: with: with: perform: with: with: with: perform: with: with: with: with:
    perform: withArgs:) includes: selector)
        ifTrue: [↑self
            addReceiver: receiver
            selector: args last "The first arg of the perform"
            super: isSuper]
        ifFalse: [self
            addReceiver: receiver
            selector: selector
            super: isSuper]

printing postScriptOut
    *"Sometimes the view needs to respond to menu messages,*
    *and sometimes I do   so always have the message*
    *go to me, and pass it on via the broadcast mechanism."* self broadcast: #postScriptOut printing printOut
"Sometimes the view needs to respond to menu messages, and sometimes I do   so always have the message go to me, and pass it on via the broadcast mechanism."

self broadcast: #printOut psForConnections: file
    locatedObjects do: [: each | each psForConnections: file].
    unRootedArrows do: [: each | each psForUnRootedArrow: file]

psForObjects: file
    locatedObjects do: [: each | each psForObject: file]

――――――――――― Diagram class ―――――――――――

Diagram class
    instanceVariableNames: '' instance creation debugger: aDiagramDebugger
    ↑self new debugger: aDiagramDebugger

――――――――――― DiagramObject ―――――――――――

Object subclass: #DiagramObject
    instanceVariableNames: 'object classes selectors location corner emphasized '
    classVariableNames: ''
    poolDictionaries: ''
    category: 'Diagrams'
DiagramObject comment:
'I am the displayed representation of an Object. My instance variables are:

object - the Object I am displaying.

classes - the classes I have message selectors for (redundant info).

selectors - a Dictionary from Classes to Collections of DiagramSelectors location - my origin corner - my corner My protocol includes adding new messages and displaying.' connecting

```
connectSelector: aSymbol class: aClass to: aDiagramObject selector: anotherSymbol class: anotherClass
    | sel1 sel2 |
    sel1 ← self getSelector: aSymbol class: aClass.
    sel1 isNil ifTrue: [↑nil].
    sel2 ← aDiagramObject getSelector: anotherSymbol class: anotherClass.
    sel2 isNil ifFalse: [sel1 connectTo: sel2]
```
connectSelector:class:to:selector:class:

```
connectSuperSelector: aSymbol class: aClass toClass: anotherClass
    | sel1 sel2 |
    sel1 ← self getSelector: aSymbol class: aClass.
    sel1 isNil ifTrue: [↑nil].
    sel2 ← self getSelector: aSymbol class: anotherClass.
    sel2 isNil ifFalse: [sel1 superConnectTo: sel2]
```
connectSuperSelector:class:toClass:

accessing

```
addClass: class
    (classes includes: class)
        ifFalse: [classes add: class]
```
addClass:

```
addSelector: selector class: class
    | sels ds |
    sels ← selectors
        at: class
        ifAbsent:
```
addSelector:class:

accessing
DiagramObject

```
            [self addClass: class.
             selectors at: class put: OrderedCollection new].
    sels detect: [: ds | ds selector == selector]
        ifNone: [sels add: (DiagramSelector of: selector)]
```

```
boundingBox
    ↑location - (0@3) corner: corner + (2@4)
```
boundingBox

```
displayed
    ↑location class == Point & (corner class == Point)
```
displayed

```
emphasized
    ↑emphasized
```
emphasized

```
getSelector: aSymbol class: aClass
    ↑(selectors at: aClass ifAbsent: [↑nil])
        detect: [: aDiagramSelector | aDiagramSelector selector == aSymbol]
        ifNone: [↑nil]
```
getSelector:class:

```
location
    ↑location
```
location

```
location: aPoint
    location ← aPoint
```
location:

```
object
    ↑object
```
object selectors
    ↑selectors emphasis deemphasize
    emphasized ifTrue: [Display reverse: self boundingBox].
    emphasized ← false emphasize
    emphasized ifFalse: [Display reverse: self boundingBox].
    emphasized ← true displaying display
    ↑self displayObject displayAt: aPoint
    | point f maxWidth maxClassWidth maxSelectorWidth |
    location ← aPoint.
    self displayed ifTrue: [Display white: self boundingBox].
    maxClassWidth ← 0.
    maxSelectorWidth ← 0.
    point ← location.
    classes do: [:class | displaying (f ← class name *contraction* asDisplayText form) displayAt: point.
        maxClassWidth ← maxClassWidth max: f width.
        point ← point + (0@f height)].
    point ← location + (maxClassWidth + 4@0).
    classes do: [:class |
        maxSelectorWidth ← maxSelectorWidth max:
            (self displaySelectorsForClass: class
                at: point).
        point ← point + (0@f height)].
    self displayBox: location + (maxClassWidth + 1 @ -2)
        extent: maxSelectorWidth @ (f height * classes size).
    emphasized ifTrue: [Display reverse: self boundingBox]

displayBox: origin corner: theCorner
    self displayBox: origin extent: theCorner - origin displayBox: origin extent: extent
    | p |
    p ← Pen new.
    p place: origin.
    p goto: origin + (extent x @ 0).
    p goto: origin + extent + (0@2).
    corner ← p location - (0@2).
    p goto: origin + (0 @ (extent y + 2)).
    p goto: origin displayMessages
    emphasized ifTrue: [Display reverse: self boundingBox].
    selectors do: [:class | class do: [:selector | selector displayMessages]].
    emphasized ifTrue: [Display reverse: self boundingBox].

selectors deemphasize emphasize display displayAt:

DiagramObject displayBox:corner:

displayBox:extent:

displayMessages

```
displayObject                                                          displayObject
    | point f maxWidth maxClassWidth maxSelectorWidth |
    self displayed ifTrue: [Display white: self boundingBox].
    maxClassWidth ← 0.
    maxSelectorWidth ← 0.
    point ← location.
    classes do: [:class |
        (f ← class name "contraction" asDisplayText form) displayAt: point.
        maxClassWidth ← maxClassWidth max: f width.
        point ← point + (0@f height)].
    point ← location + (maxClassWidth + 4@0).
    classes do: [:class |
        maxSelectorWidth ← maxSelectorWidth max:
            (self displaySelectorsForClass: class
                at: point).
        point ← point + (0@f height)].
    self displayBox: location + (maxClassWidth + 1 @ -2)
        extent: maxSelectorWidth @ (f height * classes size).
    emphasized ifTrue: [Display reverse: self boundingBox]

displaying                                                             DiagramObject displaySelectorsForClass: class at: point                              displaySelectorsForClass:at:
    | p f |
    p ← point.
    (selectors at: class ifAbsent: [↑0]) do: [:selector |
        selector origin: p.
        selector displayAt: p.
        p ← p + (selector form width + 6 @ 0)].
    ↑p x - point x displaySkeleton                                                        displaySkeleton
    | point f maxClassWidth |
    point ← location.
    maxClassWidth ← 0.
    Display white: self boundingBox.
    classes do: [:class |
        (f ← class name "contraction" asDisplayText form) displayAt: point.
        maxClassWidth ← maxClassWidth max: f width.
        point ← point + (0@f height)].
    point ← location + (maxClassWidth + 4@0).
    self displayBox: location + (maxClassWidth + 1 @ -2)
        corner: corner displayWithDelta: aPoint                                               displayWithDelta:
    | point f maxWidth maxClassWidth maxSelectorWidth |
    point ← location ← location + aPoint.
    corner ← corner + aPoint.
    self displayed ifTrue: [Display white: self boundingBox].
    maxClassWidth ← 0.
    maxSelectorWidth ← 0.
    classes do: [:class |
        (f ← class name "contraction" asDisplayText form) displayAt: point.
        maxClassWidth ← maxClassWidth max: f width.
        point ← point + (0@f height)].
    point ← location + (maxClassWidth + 4@0).
    classes do: [:class |
        maxSelectorWidth ← maxSelectorWidth max:
            (self displaySelectorsForClass: class
                at: point).
```

```
        point ← point + (0@f height)].
    self displayBox: location + (maxClassWidth + 1 @ -2)
        extent: maxSelectorWidth @ (f height * classes size).
    emphasized ifTrue: [Display reverse: self boundingBox]
``` initialization

```
of: anObject at: aPoint                                                                    of:at:
    selectors ← Dictionary new.
    object ← anObject.
    classes ← SortedCollection sortBlock: [: c1 : c2 | c1 inheritsFrom: c2].
    classes add: anObject class.
    location ← aPoint.
    emphasized ← false
```

DiagramObject comparing

```
= anObject                                                                                 =
    anObject class == self class
        ifTrue: [↑object == anObject object]
        ifFalse: [↑false]

hash                                                                                       hash
    ↑object hash
``` editing

```
removeClass: aClass                                                              removeClass:
    classes remove: aClass ifAbsent: [].
    selectors removeKey: aClass ifAbsent: []

removeReferencesTo: aDiagramSelector                                      removeReferencesTo:
    selectors
        do: [: aCollection | aCollection
            do: [: aSelector | aSelector removeReferencesTo: aDiagramSelector]]

removeSelector: aDiagramSelector                                              removeSelector:
    selectors
        associationsDo: [: anAssociation | (anAssociation value includes: aDiagramSelector)
            ifTrue: [anAssociation value remove: aDiagramSelector.
                anAssociation value isEmpty
                    ifTrue: [self removeClass: anAssociation key]]]
``` printing

```
psClass: aString at: aPoint file: aFile                                       psClass:at:file:
    self psPoint: aPoint file: aFile.
    aFile nextPut: $(.
    aFile nextPutAll: aString.
    aFile nextPutAll: ') Class psForBox: origin extent: extent file: aFile                               psForBox:extent:file:
    self psPoint: origin file: aFile.
    self psPoint: origin + extent + (0@2) file: aFile.
    aFile nextPutAll: 'Box
```

```
psForConnections: file
    selectors
        do: [: aCollection | aCollection
            do: [: selector | selector psForConnections: file]]

psForObject: file
    | maxClassWidth maxSelectorWidth point f | maxClassWidth ← 0.
    maxSelectorWidth ← 0.
    point ← location.
    classes do: [: class |
``` printing

```
        f ← class name asDisplayText form.
        self
            psClass: class name
            at: point
            file: file.
        maxClassWidth ← maxClassWidth max: f width.
        point ← point + (0@f height)].
    point ← location + (maxClassWidth + 4@0).
    classes do: [: class |
        maxSelectorWidth ← maxSelectorWidth max:
            (self
                psSelectorsForClass: class
                at: point
                file: file).
        point ← point + (0@f height)].
    self
        psForBox: location + (maxClassWidth + 1 @ -2)
        extent: maxSelectorWidth @ (f height * classes size)
        file: file psPoint: aPoint file: aFile
    aFile nextPutAll: aPoint x printString, ' '.
    aFile nextPutAll: aPoint y printString, ' ' psSelectorsForClass: aClass at: aPoint file: file
    | p f |
    p ← aPoint.
    (selectors at: aClass ifAbsent: [↑0]) do: [: selector |
        selector origin: p.
        selector psForSelectorAt: p file: file.
        p ← p + (selector form width + 6 @ 0)].
    ↑p x - aPoint x
``` psForConnections:

psForObject:

DiagramObject psPoint:file:

psSelectorsForClass:at:file:

──────────── DiagramObject class ────────────

DiagramObject class
    instanceVariableNames: ''

DiagramObject class instance creation

```
of: anObject at: aPoint
    ↑self new of: anObject at: aPoint
``` of:at:

_____ DiagramSelector _____

Object subclass: #DiagramSelector
    instanceVariableNames: 'selector origin form connectedTo superConnectedTo '
    classVariableNames: 'DownArrow LeftArrow RightArrow '
    poolDictionaries: ''
    category: 'Diagrams'
DiagramSelector comment:
'I am a single selector within a DiagramObject. I know what messages I sent. I contain protocol for adding new messages and for displaying myself and my connections.'

DiagramSelector initialization of: aSymbol
    | text |
    selector ← aSymbol.
    text ← selector size < 3
        ifTrue: [' ', selector, ' ']
        ifFalse: [selector contractTo: 20].
    form ← text asDisplayText form.
    connectedTo ← OrderedCollection new.

of:

accessing boundingBox
    ↑form boundingBox translateBy: origin boundingBox connectTo: aDiagramSelector
    connectedTo detect: [: each | each == aDiagramSelector]
        ifNone: [connectedTo add: aDiagramSelector]

connectTo:

form
    ↑form form origin
    ↑origin origin origin: aPoint
    origin ← aPoint origin:

selector
    ↑selector selector superConnectTo: aDiagramSelector
    superConnectedTo ← aDiagramSelector superConnectTo:

displaying arrivalPoint
    ↑self boundingBox left
        + (self boundingBox right - self boundingBox left // 3)
            @ (self boundingBox top - 10)

arrivalPoint departurePoint
    ↑self boundingBox left + (self boundingBox right - self boundingBox left // 3 * 2)
        @ self boundingBox top departurePoint display
    self displayAt: origin display

```
displayAt: aPoint                                                              displayAt:
    form displayAt: aPoint displayMessages                                                                displayMessages
    connectedTo
        do: [: otherSelector |
            self displayMessageTo: otherSelector].
    self drawSuper displayMessageTo: otherSelector                                                displayMessageTo:
    self drawCurve: otherSelector.
    self drawArrowHead: otherSelector displayUnRootedArrow                                                           displayUnRootedArrow
    | p1 p2 p3 | p3 ← self arrivalPoint.
    p2 ← p3 translateBy: 0@-20.
    p1 ← p2 translateBy: -10@-10.
    Curve new
        firstPoint: p1;
        secondPoint: p2;
        thirdPoint: p3;
        form: (Form extent: 2 @ 2) black;
        display.
    RightArrow displayOn: Display at: p3 rule: Form paint drawArrowHead: otherSelector                                                   drawArrowHead:
    | p1 p2 | p1 ← self departurePoint.
    p2 ← otherSelector arrivalPoint.

(p1 x < p2 x
        ifTrue: [RightArrow]
        ifFalse: [LeftArrow]) displayOn: Display at: p2 rule: Form paint drawCurve: otherSelector                                                       drawCurve:
    | p1 p2 |
    p1 ← self departurePoint.
    p2 ← otherSelector arrivalPoint.
    Curve new
        firstPoint: p1;
        secondPoint: (self midPointOf: p1 and: p2);
        thirdPoint: p2;
        form: (Form extent: 2 @ 2) black;
        display drawSuper                                                                      drawSuper
    | p atPoint | superConnectedTo isNil
        ifFalse: [p ← Pen new up defaultNib: 2.
            p goto: self superDeparturePoint.
            p down goto: (atPoint ← superConnectedTo superArrivalPoint).
            self drawSuperArrowHead: atPoint]

drawSuperArrowHead: atPoint                                                    drawSuperArrowHead:
    DownArrow
        displayOn: Display
        at: atPoint
        rule: Form paint
``` midPointOf: p1 and: p2
    "The 40 is to reserve space for the arrow head"
    ↑(p1 x + p2 x // 2) abs
        @ (((p1 y min: p2 y) - (p1 x - p2 x) abs) min: p2 y - 40)

superArrivalPoint
    ↑self boundingBox left + self boundingBox right // 2
      @ (self boundingBox top - 2)

superDeparturePoint
    ↑self boundingBox left + self boundingBox right // 2
      @ (self boundingBox bottom - 3)

editing removeReferencesTo: aDiagramSelector
    connectedTo
        remove: aDiagramSelector
        ifAbsent: [↑self]

comparing

= anObject
    ↑anObject class == self class
        and: [anObject selector == selector]

hash
    ↑selector hash printing psForConnection: file to: aSelector
    | p1 p3 p2 | p1 ← self departurePoint.
    p3 ← aSelector arrivalPoint.
    p2 ← self midPointOf: p1 and: p3.
    self psPoint: p1 file: file.
    self psPoint: p2 file: file.
    self psPoint: p3 file: file.
    file nextPutAll: 'Connect psForConnections: file
    connectedTo
        do: [: otherSelector | self psForConnection: file to: otherSelector].
    superConnectedTo isNil
        ifFalse: [self psForSuper: file]

psForSelectorAt: aPoint file: file
    self psPoint: aPoint file: file.
    file nextPut: $(.
    file nextPutAll: (selector size < 3
        ifTrue: [' ', selector, ' ']
        ifFalse: [selector contractTo: 20]).
    file nextPutAll: ') Selector psForSuper: file                                                                          psForSuper:
    | p1 p3 p2 | p1 ← self superDeparturePoint.
    p2 ← superConnectedTo superArrivalPoint.
    self psPoint: p1 file: file.
    self psPoint: p2 file: file.
    file nextPutAll: 'SuperConnect psForUnRootedArrow: file                                                                  psForUnRootedArrow:
    | p1 p2 p3 | p3 ← self arrivalPoint.
    p2 ← p3 translateBy: 0@-20.
    p1 ← p2 translateBy: -10@-10.
    self psPoint: p1 file: file.
    self psPoint: p2 file: file.
    self psPoint: p3 file: file.
    file nextPutAll: 'Connect psPoint: aPoint file: aFile                                                               psPoint:file:
    aFile nextPutAll: aPoint x printString, ' '.
    aFile nextPutAll: aPoint y printString, ' '

──────────────────── DiagramSelector class ────────────────────

DiagramSelector class                                                                     DiagramSelector class
    instanceVariableNames: ''

Instance creation of: aSymbol                                                                               of:
    ↑self new of: aSymbol class initialization initialize                                                                                initialize
    LeftArrow ← self leftArrow.
    RightArrow ← self rightArrow.
    DownArrow ← self downArrow

*"DiagramSelector initialize"* accessing downArrow                                                                                 downArrow
    ↑Form
        extent: 5@6
        fromArray: #( 63488 63488 28672 28672 8192 8192)
        offset: -2@0 leftArrow                                                                                 leftArrow
    ↑Form
        extent: 6@12
        fromArray: #( 57344 64512 63488 63488 61440 61440 57344 57344 49152 49152 32768 32768)
        offset: -2@0 rightArrow
   ↑Form
      extent: 6@12
      fromArray: #( 7168 64512 31744 31744 15360 15360 7168 7168 3072 3072 1024 1024)
      offset: -3@0 rightArrow

DiagramSelector initialize

———————————— DiagramView ————————————

View subclass: #DiagramView            DiagramView
   instanceVariableNames: 'previousLocation '
   classVariableNames: ''
   poolDictionaries: ''
   category: 'Diagrams'
DiagramView comment:
'I display a Diagram and keep track of my current window on the screen.' initialize-release release            release
   model release.
   super release controller access defaultControllerClass            defaultControllerClass
   ↑DiagramController displaying displayView            displayView
   previousLocation isNil
      ifTrue: [previousLocation ← self insetDisplayBox origin.
         model displayWithDelta: 0@0]
      ifFalse: [model displayWithDelta: self insetDisplayBox origin - previousLocation.
         previousLocation ← self insetDisplayBox origin]

printing postScriptOut            postScriptOut
   | fileName file | fileName ← FillInTheBlank request: 'File Name' initialAnswer: ''.
   fileName = '' ifTrue: [↑self].
   file ← Disk newFile: fileName.
   Cursor write
      showWhile: [self postScriptOut: file].
   file close postScriptOut: file            postScriptOut:
   self psForSetPage: file.
   model psForConnections: file.
   model psForObjects: file printOut                                                                                           printOut
    | form name | name ← FillInTheBlank
        request: 'File name?' printing                                                                                    DiagramView initialAnswer: ''.
    name isEmpty
        ifTrue: [↑nil].
    form ← Form fromDisplay: self displayBox.
    Cursor write
        showWhile: [form writeOn: name].

psForSetPage: file                                                                              psForSetPage:
    | b |
    b ← self insetDisplayBox.
    file nextPutAll: b left printString, ' '.
    file nextPutAll: b top printString, ' '.
    file nextPutAll: b right printString, ' '.
    file nextPutAll: b bottom printString, ' '.
    file nextPutAll: 'SetPage _____ DiagramView class _____

DiagramView class                                                                           DiagramView class
    instanceVariableNames: ''

Instance creation debugger: aDiagramDebugger                                                                      debugger:
        | view |
        view ← self new.
        view model: (RecordingDiagram debugger: aDiagramDebugger).
        view insideColor: Form white deepCopy.
        ↑view

What is claimed:

1. An object oriented program employing a plurality of transmitting objects, a plurality of receiving objects, a plurality of messages, wherein said plurality of messages are transmitted to said plurality of receiving objects by said transmitting objects, and an existing debugger routine, wherein said existing debugger routine can suspend operation of said program; a diagramming debugger process comprising the steps of: recording transmission of said plurality of messages from said plurality of transmitting objects as the program is running wherein said recording includes examining a next program instruction, recording names of transmitting objects, recording messages sent, recording names of receiving objects, and allowing the existing debugger operation to take place; graphically representing the recorded transmission, wherein said graphic representation includes: a first plurality of area-limited representations of said transmitting objects; a second plurality of area-limited representations of receiving objects; and a third plurality of area-limited representations of said messages.

2. The diagramming debugger process according to claim 1 wherein: said first plurality of area-limited representations of said transmitting objects comprise rectangular boxes, and wherein the names of said transmitting objects are in juxtaposition with said boxes.

3. The diagramming debugger process according to claim 1 wherein:

said second plurality of area-limited representations of said receiving objects comprise rectangular boxes, and wherein the names of said receiving objects are in juxtaposition with said boxes.

4. The diagramming debugger process according to claim 3 wherein:

said third plurality of area-limited representations of said messages comprise arrows and text, said arrows extending from said first area-limited representations to said second area-limited representations, and said text being placed in said rectangular boxes of said second plurality of area-limited representations.

5. A method for monitoring the operation of an object oriented program while operating a debugger routine in an object oriented programming system, including graphically representing the operation of said program while said program is running, wherein the method is executed by a computer, the method comprising the steps of:

halting the debugger;
duplicating a current context of said debugger;
examining the duplicate context;
recording transmitting objects, messages transmitted by said transmitting objects, and objects which receive said messages during examination of the duplicate context;
generating graphic representations of said recording, said representations comprising first area-limited representations of said transmitting objects, second area-limited representations of said receiving objects, and third area-limited representations of said messages; and
displaying said graphic representations as visible output.

6. The method according to claim 5 wherein:

said first area-limited representations comprise first rectangles with the transmitting objects' names adjacent said first rectangles;
said second area-limited representations comprise second rectangles with the receiving objects' names adjacent said second rectangles; and
said third area-limited representations comprise arrows originating in said first rectangles and terminating in said second rectangles, with the text of said messages placed within the perimeter of said second rectangles.

7. The method according to claim 6 wherein the step of generating said second representations further comprises modifying said first representations if the receiving objects are within the same class as the transmitting objects, said modifying comprising the steps of:

extending the rectangle of said first graphic representations;
adding the name of the receiving objects below the name of the transmitting objects; and
adding the name of the transmitted messages within the perimeter of the rectangles and adjacent to the receiving objects' names.

8. The method according to claim 5 wherein:

the step of displaying a visible output of said graphic representations comprises displaying an image on a computer terminal.

9. The method according to claim 5 wherein:

the step of displaying a visible output of said graphic representations comprises displaying an image on a computer printer.

10. The method according to claim 5 wherein said first area-limited representations of said transmitting objects are displayed in the temporal order in which the objects, which said representations represent, transmit messages.

11. The method according to claim 5 wherein said second area-limited representations of said receiving objects are displayed in the temporal order in which the objects, which said representations represent, receive messages.

12. The method according to claim 5 wherein said third area-limited representations of said messages are displayed in the temporal order in which messages, which said representations represent, are transmitted.

13. The method for monitoring the operation of an object oriented program while operating a debugger routine in an object oriented programming system, including graphically representing the operation of said program while said program is running, wherein the method is executed by a computer, the method comprising the steps of:

halting the debugger;
duplicating a current context of said debugger;
examining the duplicate context;
recording transmitting objects, messages transmitted by said transmitting objects, and objects which receive said messages during said examining of the duplicate context;
generating a plurality of area-limited graphic representations of said transmitting objects, of said receiving objects and, said messages; and
displaying said graphic representations as visible output.

14. The method according to claim 13 including selectively skipping one or more steps of displaying graphic representations of individual transmitting objects, graphic representations of messages, receiving objects.

15. A graphic debugger process used within an object oriented computer system while running an object oriented program, the process comprising:

acquiring transmitting-object information, receiving-object information and transmitted-message information;
generating area-limited graphic representations of said information; and
displaying said graphic representation.

16. A graphic debugger process as set forth in claim 15 wherein the step of acquiring said transmitting object information, said receiving object information, and said transmitted message information comprises:
halting operation of an existing debugger routine;
duplicating the context of the existing debugger routine;
examining the operation of the existing debugger routine;
storing the transmitting-object information in memory;
storing the receiving-object information in memory;
storing the transmitted-message information in memory; and
continuing operation of the existing debugger routine.

17. A graphic debugger process as set forth in claim 16 wherein said generating area-limited graphic representations of said information comprises the steps of:

generating a first area-limited representation of said transmitting-object information, said first area-limited representation including a first rectangle with the transmitting object name adjacent to said first rectangle;

generating a second area-limited representation of said receiving-object information, said second area-limited representation including a second rectangle with the receiving object name adjacent to said second rectangle; and generating a third area-limited representation of said transmitted-message information, said third area-limited representation including an arrow, originating proximate said first rectangle and terminating proximate said second rectangle, with the text of said message placed within the perimeter of said second rectangle.

* * * * *